(12) United States Patent
Nakura-Fan

(10) Patent No.: US 9,557,825 B2
(45) Date of Patent: Jan. 31, 2017

(54) FINGER POSITION SENSING AND DISPLAY

(71) Applicant: Maxwell Minoru Nakura-Fan, Bellevue, WA (US)

(72) Inventor: Maxwell Minoru Nakura-Fan, Bellevue, WA (US)

( * ) Notice: Subject to any disclaimer, the term of this patent is extended or adjusted under 35 U.S.C. 154(b) by 60 days.

(21) Appl. No.: 14/300,587

(22) Filed: Jun. 10, 2014

(65) Prior Publication Data

US 2015/0355723 A1    Dec. 10, 2015

(51) Int. Cl.
*G06F 3/023*    (2006.01)
*G06F 3/0488*    (2013.01)
*G06F 3/03*    (2006.01)

(52) U.S. Cl.
CPC ............ *G06F 3/023* (2013.01); *G06F 3/0233* (2013.01); *G06F 3/0325* (2013.01); *G06F 3/04886* (2013.01); *G06F 2203/04108* (2013.01)

(58) Field of Classification Search
CPC ............ G06F 3/023; G06F 3/03; G06F 3/02; G06F 3/0488; G06F 3/0489; G06F 3/04895; G06F 3/0433; G06F 3/017; G06F 3/0233; G06F 3/04886; G06F 3/0325
USPC ........................................................ 345/168
See application file for complete search history.

(56) References Cited

U.S. PATENT DOCUMENTS

| | | | | |
|---|---|---|---|---|
| 8,982,104 B1* | 3/2015 | Fujishima | ............. | G06F 3/0433 178/18.04 |
| 2004/0113956 A1* | 6/2004 | Bellwood | ........... | G06F 3/04895 715/863 |
| 2005/0246459 A1* | 11/2005 | Philipp | .................... | G10H 1/34 710/67 |
| 2007/0091070 A1* | 4/2007 | C. Larsen | ............ | G06F 3/0213 345/168 |
| 2010/0103103 A1* | 4/2010 | Palanker | ................ | G06F 3/023 345/158 |
| 2010/0148995 A1* | 6/2010 | Elias | ..................... | G06F 3/0488 341/22 |
| 2012/0038496 A1* | 2/2012 | Edwards | ................. | G06F 3/017 341/34 |
| 2013/0127722 A1* | 5/2013 | Gu | ........................... | G06F 3/02 345/166 |
| 2014/0091857 A1* | 4/2014 | Bernstein | ............... | H01H 13/14 327/517 |
| 2014/0172557 A1* | 6/2014 | Eden | ..................... | G06F 3/0488 705/14.49 |
| 2014/0241780 A1* | 8/2014 | Knighton | .............. | G06F 3/0205 400/473 |

(Continued)

OTHER PUBLICATIONS

Internation Search Report & Notice of Transmittal for Application PCT/US2015/034983, Sep. 10, 2015 (5 pages).

(Continued)

*Primary Examiner* — Fred Tzeng
(74) *Attorney, Agent, or Firm* — Peloquin, PLLC; Mark S. Peloquin, Esq.

(57) ABSTRACT

An apparatus includes a first sensor associated with a key location on a keyboard. The first sensor provides a finger presence signal when a user's finger is over the key location. A method includes generating a finger presence signal when a user's finger is over a key of a keyboard. The finger presence signal is received after it is generated. The finger presence signal is associated with a key of the keyboard to produce an association of the user's finger and the key.

25 Claims, 16 Drawing Sheets

(56) References Cited

U.S. PATENT DOCUMENTS

2014/0354550 A1* 12/2014 Mendonca ................ G06F 3/02
 345/168
2015/0268812 A1* 9/2015 Walline ................ G06F 3/0489
 715/773
2015/0280707 A1* 10/2015 Hovden ............. H03K 17/9622
 341/33

OTHER PUBLICATIONS

Written Opinion for Application PCT/US2015/034983, Sep. 10, 2015 (10 pages).

* cited by examiner

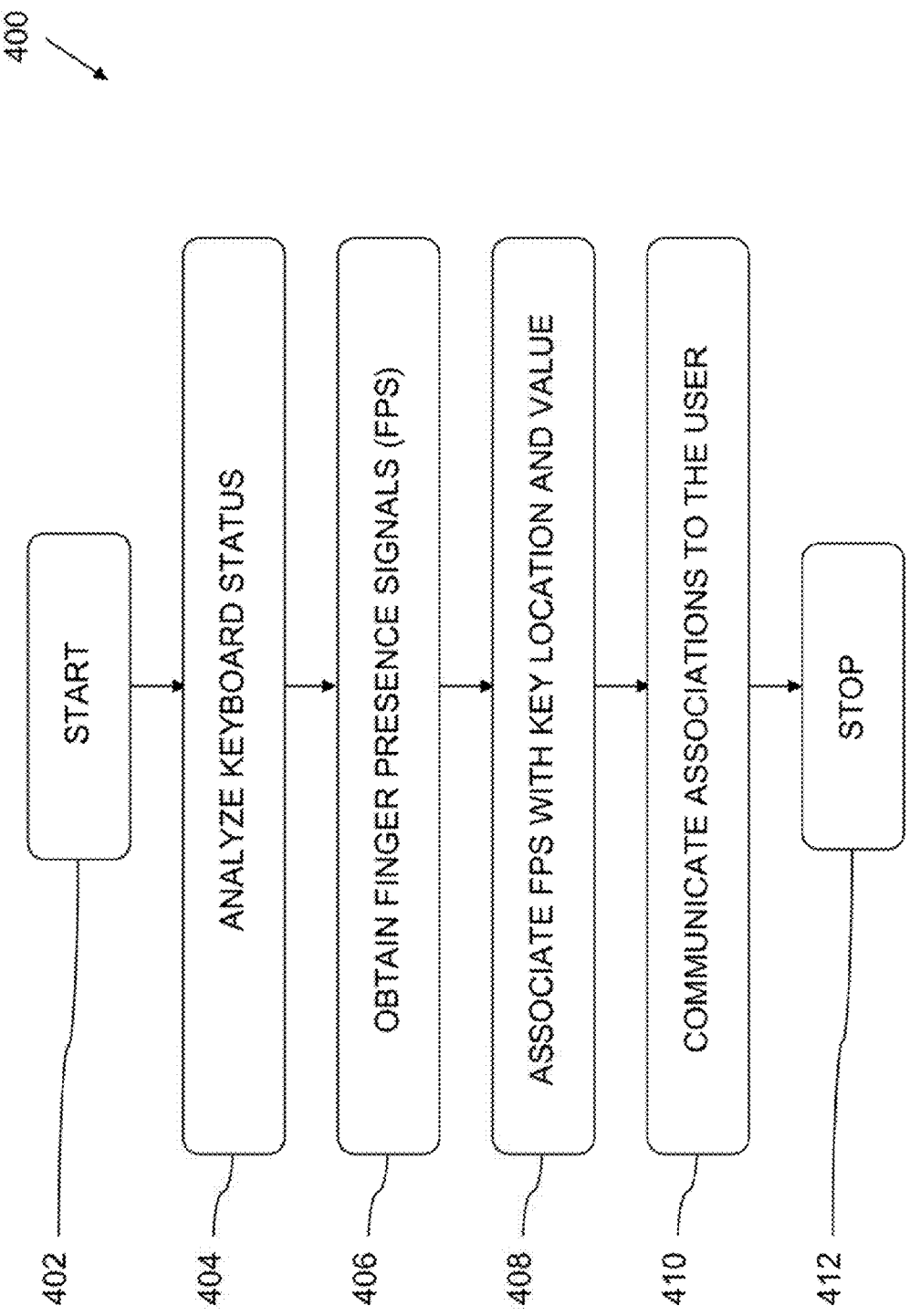

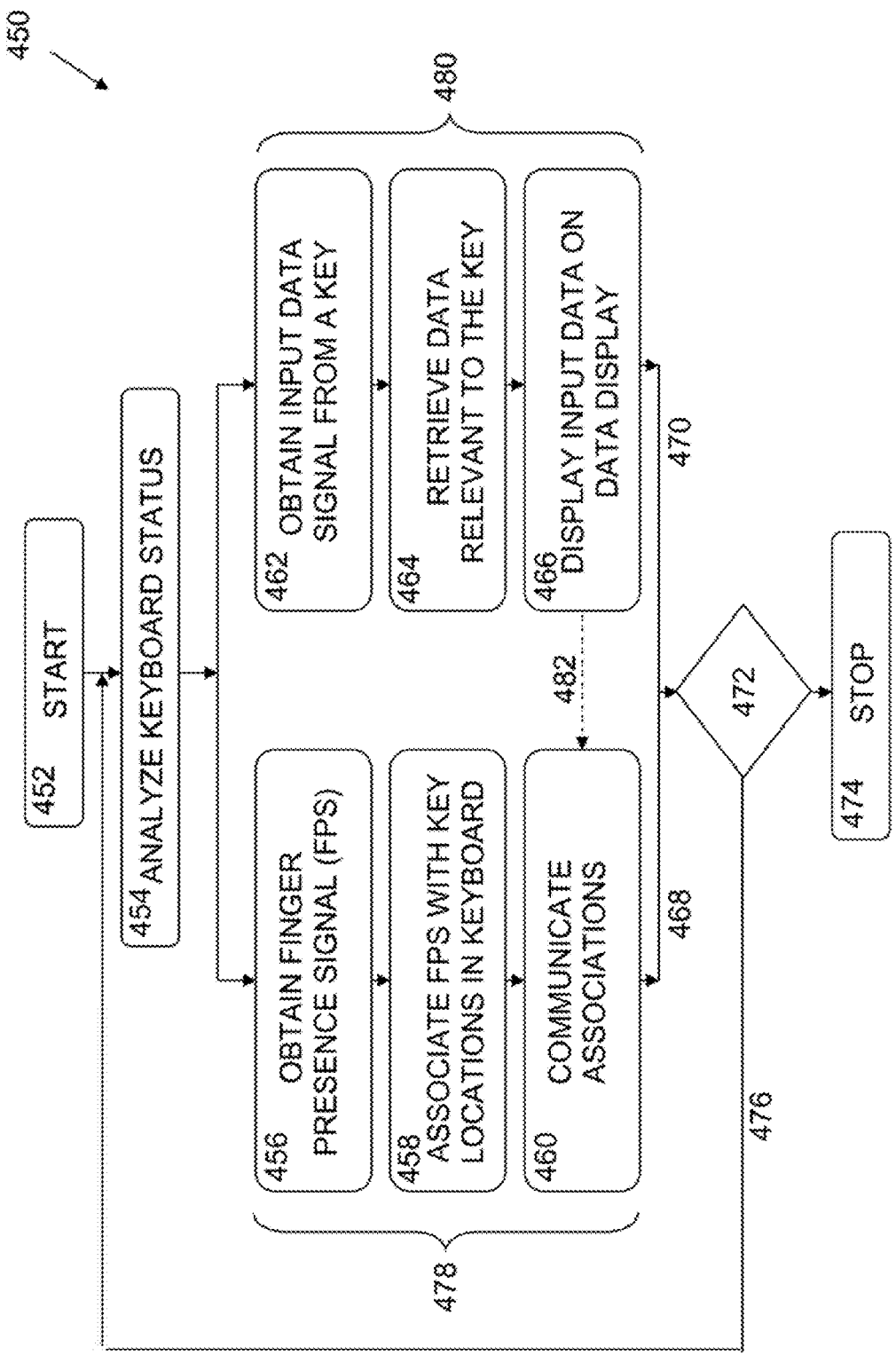

FINGER POSITION SENSING AND DISPLAY

BACKGROUND OF THE INVENTION

1. Field of Invention

The invention relates generally to ascertaining finger position during typing and more specifically to providing continuous feedback on finger position during typing.

2. Art Background

Learning to type on a keyboard when a person does not look at the keyboard during typing is referred to as "blind typing" or "touch typing." During properly executed blind typing, the person's eyes are either on a paper, which is the source of content being typed, or the person's eyes are on the computer screen associated with the word processing system. Proficiency at blind typing can result in much higher typing rates than can be achieved when a person has to look at the keyboard in order to find the correct key. However, blind typing takes time to learn. Often a person who is learning to blind type does not know which key a finger is over. This can result in mistakes during typing which decrease the rate of typing correctly spelled words. This can present a problem.

Some keyboards place indicia, such as a small raised bump, on two keys for example, the "F" key and the "J" key for location with the pointer finger of a left and right hand respectively, these are called "Home" keys. Home keys assist the person in finding the home position however it is still a time consuming process to memorize a keyboard layout so that a person can type accurately without looking at the keyboard. This can present a problem. Some keyboards such as virtual keyboards do not have physical keys on which indicia could be placed for home keys. Thus, virtual keyboards can present steeper learning curves to a person learning to type. This can present a problem.

Even with indicia to identify home keys, mistakes made during blind typing are exacerbated by lack of familiarity with a given keyboard layout. Not all keyboards have the keys arranged in the same order, for example, the following acronyms refer to several keyboard layouts QWERTY, AZERTY, Dvorak, ABCDE, and XPeRT. Moving from one keyboard to another presents a new learning experience to a person, which can result in an increased typing error rate. This can present a problem.

Wearable computing devices are worn by a person and include a data display built into eye glasses or goggles for example. At times a person wearing a wearable computer device might be constrained by the activity and prevented from looking at a keyboard which is being used as an input device for the wearable computing device. Input error can result from blind typing when the wrong key is pressed due to the user not knowing which key a finger is over at a given point in time. This can present a problem.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings, in which like references indicate similar elements.

FIG. 4A illustrates a process for communicating finger presence associations to a user, according to embodiments of the invention.

FIG. 4B illustrates anther process for obtaining and displaying hot-key associations on a data display, according to embodiments of the invention.

DETAILED DESCRIPTION

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense, and the scope of the invention is defined only by the appended claims.

Apparatuses and methods are described for communicating which keys of a keyboard a user's finger are over at any point in time.

Figure 1A:
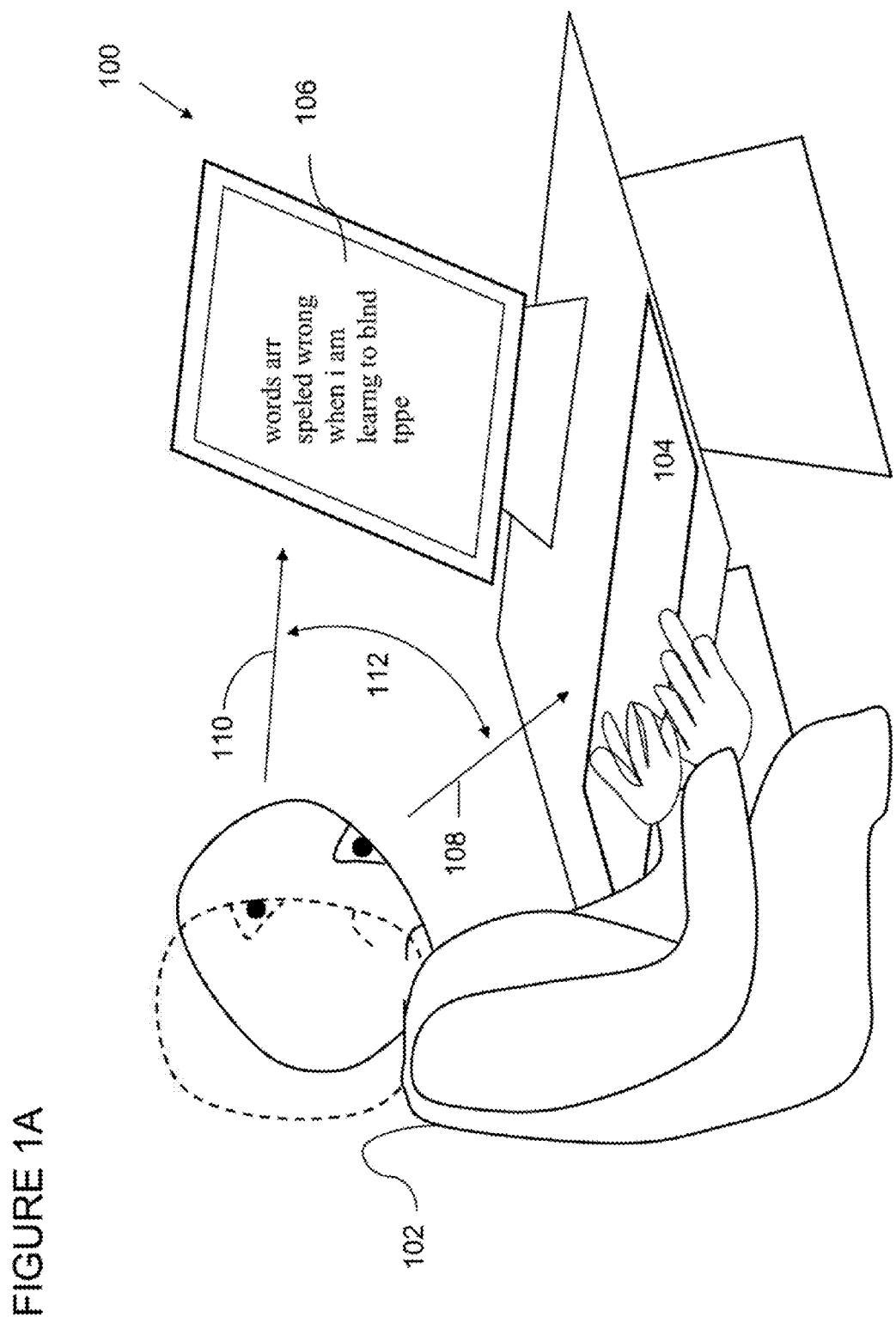
FIG. 1A illustrates a limitation of an existing keyboard.

FIG. 1A illustrates, generally at 100, a limitation of an existing keyboard. With reference to FIG. 1A, a user 102 is typing on a keyboard 104. The keyboard 104 depicted in FIG. 1A can be either a physical keyboard or a virtual keyboard. The data are input via the keyboard 104 into a data processing system and appear on a data display 106. As the user 102 types, the user looks at the keyboard 104 as indicated with line of sight 108. Alternately, as indicated by an arrow 112, the user 102 moves his or her head up to look at the data display 106 as indicated by a line of sight 110 and the dashed line indicating the alternative head position. This user is learning to blind type or alternatively using a keyboard with a layout which is new to the user and therefore ends up with a high percentage of misspelled words as evidenced by the text on the data display 106 which reads: "words arr speled wrong when i am learng to blnd tppe."

Figure 1B:
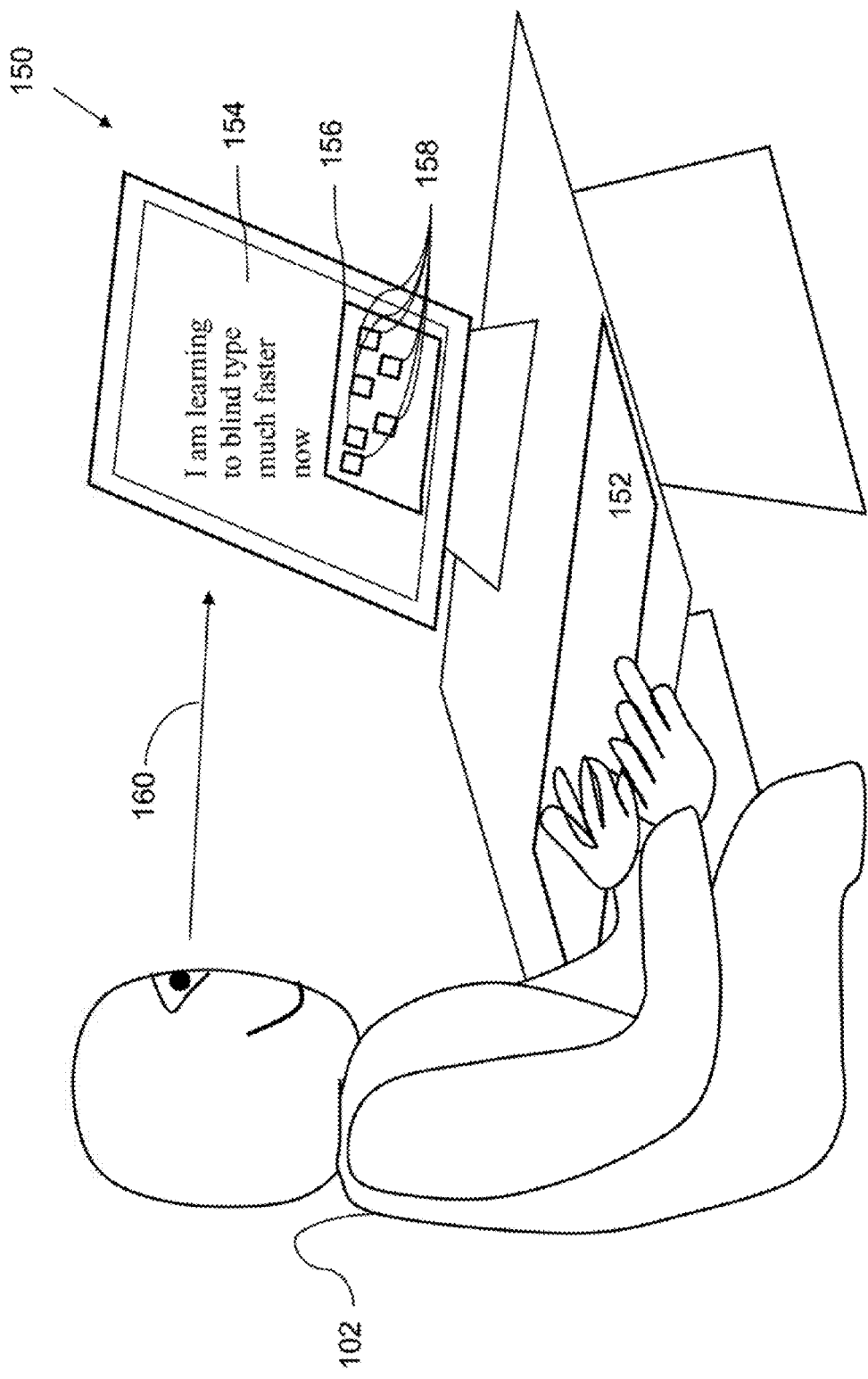
FIG. 1B illustrates a data display, according to embodiments of the invention.

FIG. 1B illustrates, generally at 150, a data display, according to embodiments of the invention. With reference to FIG. 1B, a user 102 maintains a line of sight 160 looking at the data display 154 while blind typing. In various embodiments, an association between the presence of the user's fingers and the keys of the keyboard 152, which the user's fingers are over, is displayed in a region 156 (window) of the data display 154. The association, communicated by hot-keys (a hot-key is differentiated in appearance from a key which does not have a finger presence association) indicated at 158, is displayed in the region 156 and communicates instantaneously to the user 102 which keys the user's fingers are over. As used in this description of embodiments, the term "hot-key" is used to refer to a key of a keyboard that has a finger presence associated therewith. The region 156 is also referred to as a soft keyboard since it is a graphical representation of the physical keyboard 152 or a graphical representation of a portion of the physical keyboard 152. In some embodiments, described below, the soft keyboard 156 is a graphical representation of a virtual keyboard. The need to look at the keyboard 152 is obviated by the display of hot-keys 158 in the window 156 (soft keyboard). The learning curve associated with blind typing or using a new keyboard layout is decreased through use of embodiments of the invention because a user can adjust finger position based on the associations 158 appearing on the soft keyboard 156. In some embodiments, the user is able to see where his or her finger's are placed without needing to fully press the key of the keyboard. As used in this detailed description of embodiments, the presence of a user's finger "over" a key has a plurality of meaning as defined herein including: (1) above the key but not touching the key; (2) contacting the key but not depressing the key; (3) pressing the key by an amount less than that which causes the key to log a data entry; and (4) pressing the key by an amount which does cause the key to log a data entry.

Figure 2:
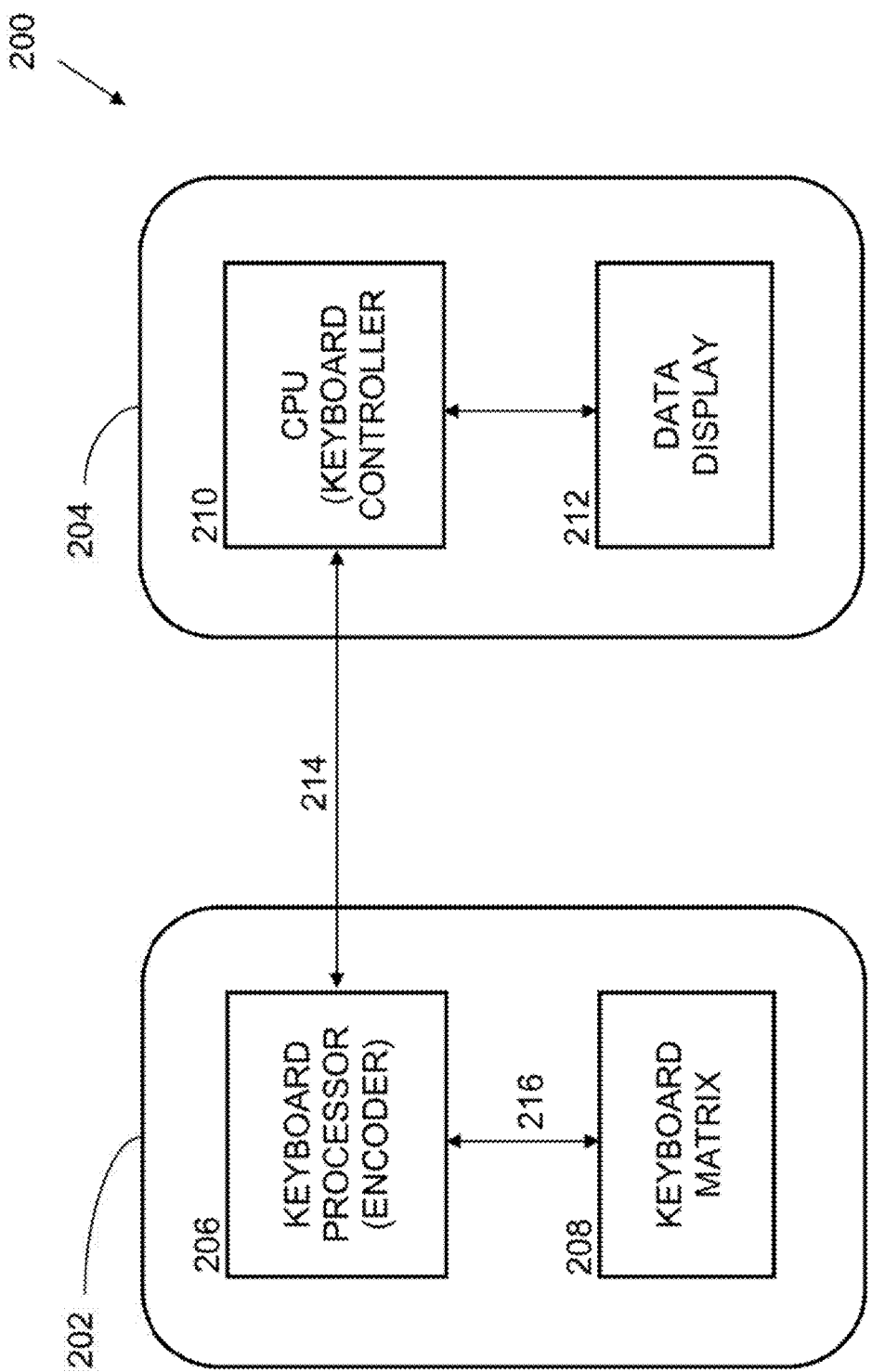
FIG. 2 illustrates a block diagram for a keyboard and data processing system, according to embodiments of the invention.

FIG. 2 illustrates, generally at 200, a block diagram for a keyboard and data processing system, according to embodiments of the invention. With reference to FIG. 2, a keyboard 202 includes a keyboard processor 206, also referred to as a keyboard encoder, in electrical communication 216 with a keyboard matrix 208. The keyboard 202 is coupled to a data processing device (system) 204 with connection 214. The terms data processing system and data processing device are used interchangeably through this description. The data processing device 204 includes a main central processing unit (CPU) 210 and a data display 212, as well as other components not shown in the figure to facilitate transfer of data there between. The data processing system 204 is a general representation of a data processing system such as is commonly know as, e.g., a desktop computer, a laptop computer, a tablet computer or pad, a smart phone, a wearable computer, etc. without limitation as to computing device. The connection 214 can be a hardwired cable or a wireless connection such as for example a wireless connection according to the Bluetooth protocol.

The keyboard 202 provides a user interface through which a user can input commands (system and application level commands) and alpha-numeric data into the data processing system 204. The keyboard matrix 208 is commonly configured as a grid of conductive paths (often a wire is used for a conductive path) nominally arranged in a series of horizontal and vertical paths with a switch (sensor) located at the intersection of each horizontal and vertical conductive path.

As used in this description of embodiments, the word "switch" will be understood to encompass the meaning of the word "sensor." As such, the terms are used interchangeably herein. As those of skill in the art understand, a "switch" is used to complete a circuit along a certain path. Thus, in one example, a switch used to complete a circuit between two conductive paths performs the function of a sensor with respect to a user's finger pushing on a key of a keyboard that completed the circuit. In another example, a multilevel switch provides additional sensor functionality with more than two states. In other examples, a "sensor" is constructed with one or more inputs and an algorithm is used by a data processing system to provide discrete, semi-continuous, or continuous output with respect to an input.

Figure 3:
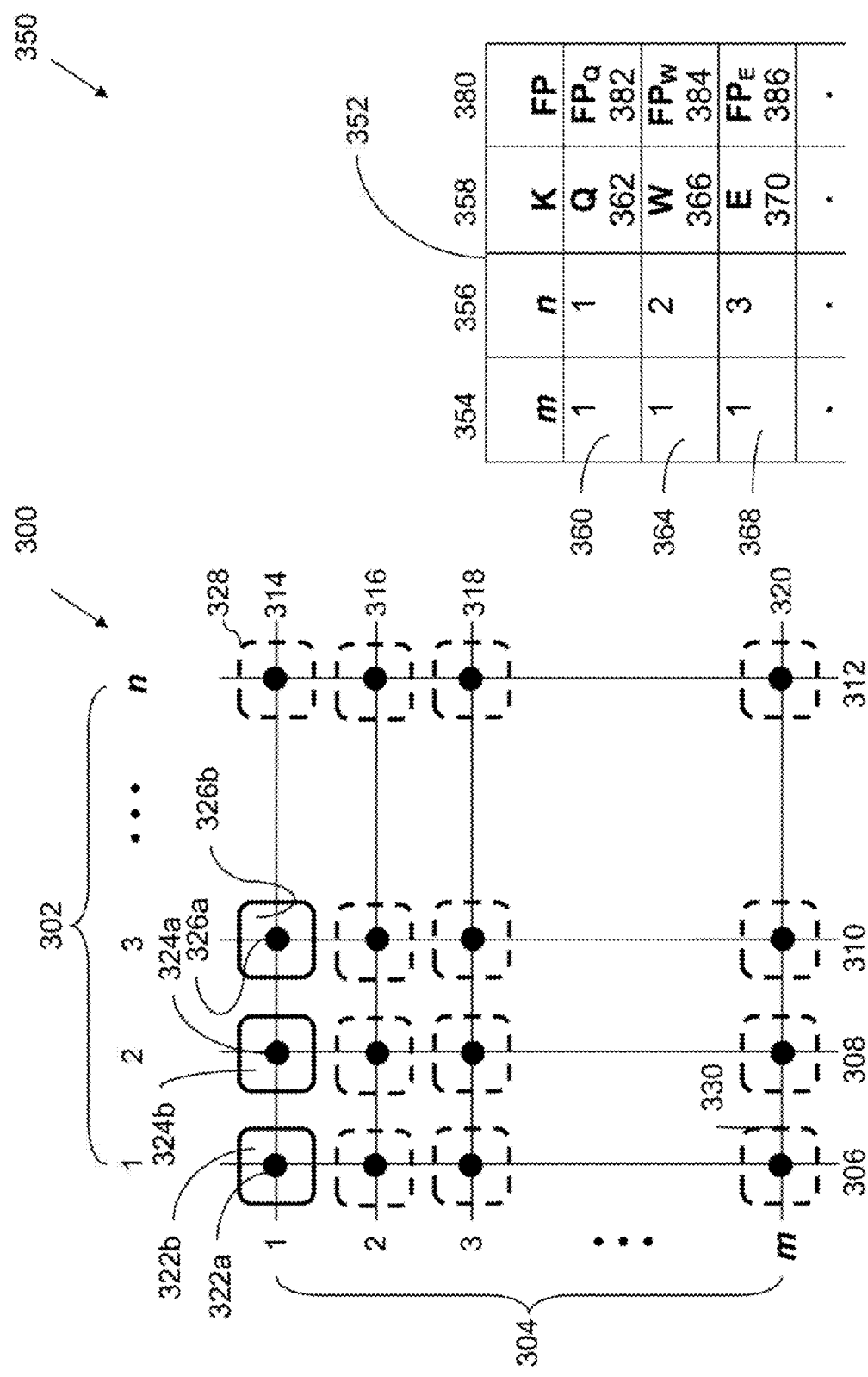
FIG. 3 illustrates a keyboard matrix, according to embodiments of the invention.

FIG. 3 illustrates a keyboard matrix, according to embodiments of the invention. With reference to FIG. 3 at 300 a general representation of a keyboard matrix is shown with a general number of m rows and n columns. Each key of a keyboard will correspond with a crossing of a nominally horizontal and a nominally vertical conductive path within a keyboard matrix as described below. A keyboard matrix construct has become a commonly used technique to reduce the number of individual conductive paths needs to access the complement of keys on a keyboard, thereby simplifying the keyboard interface. "Nominal" is used herein to describe horizontal or vertical orientation of the conductive paths because there is no rigid constraint on the orientation that the conductive paths make with each other. In some instances the angle between a nominally horizontal and vertical conductive path will vary between zero degrees (parallel arrangement not shown in the figure) and ninety degrees (as shown in the figures. e.g., FIG. 3) and can vary along the length of the conductive path as desired (not shown). For the remainder of this discussion, it will be understood that reference to horizontal or vertical implies "nominal" even though the word "nominal" will not be used in the interest of clarity.

For each of the n columns 302, a vertically oriented conductive path is created as illustrated by 306, 308, 310, and 312. Similarly, for each of the m rows 304, a horizontally oriented conductive path is created as is illustrated by 314, 316, 318, and 320. Conductive paths 306, 308, 310, 312, 314, 316, 318, and 320 can be implemented in various ways with wires, conductive traces on a printed circuit board, etc. Typically, a sensor (switch) is located at each place where a horizontal and vertical path cross as indicated by solid circles, e.g., 322a, 324a, and 326a (the remaining solid circles are not numbered for clarity within the illustration). A sensor (switch) is located at each solid circle. When mechanical switches are used, typically all switches are in the open state until a key is pressed. Any type of mechanical switch technology can be used, such as but not limited to, rubber dome switches, membrane switches, metal contact, foam element, scissor switch, buckling spring, hall-effect, etc. Embodiments of the invention are not limited by the type of sensor (switch) implemented in a keyboard. Alternatively, when capacitive switches (sensors) are used, current flows through the whole keyboard matrix. When a key is pressed the capacitive switch causes the current flow to change. The processor senses this change and interprets it as a key press. In other embodiments a resistive switch element is used to sense a key press.

Along the first row, the first three switches and conductive paths are configured in the following way. A switch 322a is coupled to a key 322b of a keyboard and to conductive path 306 and conductive path 314. Similarly, a switch 324a is coupled to a key 324b of the keyboard and to conductive path 308 and conductive path 314. Similarly, a switch 326*a* is coupled to a key 326*b* of the keyboard and to conductive path 310 and conductive path 314.

A typical mode of operation of a keyboard is accomplished by a keyboard processor, also referred to as an encoder, such as 206 in FIG. 2 supplying a source of electrical power to the columns (conductive paths 306, 308, 310, and 312) and sensing any power on the rows (conductive paths 314, 316, 318, and 320) resulting from a completed circuit from a depressed key of the keyboard. With mechanical switches used in the open state (as default for non-depressed keys), the keyboard encoder 206 typically supplies power by sequencing the power from one conductive path to the other. The keyboard encoder 206 (FIG. 2) continuously senses for power on the rows (conductive paths 314, 316, 318, and 320). When a user presses the key, such as for example 322*b*, electrical continuity is made between conductive path 306 and 314 and the pressed key is detected by the keyboard encoder 206 (FIG. 2).

The keyboard encoder 206 (FIG. 2) or other processor participating in control of the keyboard, associates the pressed key with a keyboard character reference chart 352 to obtain the character or function associated with the pressed key. A keyboard character reference chart is illustrated generally at 350 in FIG. 3. A keyboard character reference chart can be implemented as a lookup table stored in memory, such as read only memory (ROM) accessible to a keyboard encoder or other processor. In one embodiment, the keyboard character reference chart 352 has a first column 354 corresponding to a row index "m" of the keyboard matrix 300, a second column 356 corresponding to column index "n" of the keyboard matrix 300 and the corresponding function value or data value is shown in column 358 with heading "K."

In one example, utilizing the well known QWERTY keyboard, the data values for the first three text keys to the right of the "Tab" key (not shown) which are in the first row used for alpha input with a QWERTY keyboard are shown in column 358 with column heading "K." By way of example, when a user presses the key 322*b*, row, column indices (1, 1) are registered by a keyboard encoder during scanning of the keyboard matrix 300. Entering the keyboard reference chart 352 with row, column indices (1, 1) at row 360 corresponds with a data value of "Q" as indicated at 362. Similarly, when a key 324*b* is pressed by the user, current flows from conductive path 308 to conductive path 314 and is sensed by the keyboard encoder. Entering the keyboard reference chart 352 with row, column indices (1, 2) at row 364 correspond with a data value of "W" as indicated at 366. Similarly, when a key 326*b* is pressed by the user, current flows from conductive path 310 to conductive path 314 and is sensed by the keyboard encoder 206. Entering the keyboard reference chart 352 with row, column indices (1, 3) at row 368 corresponds with a data value of "E" as indicated at 370. In this example, since the "Shift" key was not pressed simultaneously the actual data values are lower case alpha characters, "q, w, and e." Upper case Q, W, and E are used in this description since the keyboard keys are usually marked with these upper case letters. Similar functionality of the keyboard with keys indicated with dashed lines such as 328, 330, etc. are used to enter chart 352 to retrieve the appropriate data value that represents alpha-numeric data or function for a given keyboard layout.

The example above is directed to the QWERTY keyboard, however embodiments of the invention are readily implemented with any keyboard design such as but not limited to QWERTY, AZERTY, Dvorak, ABCDE. XPeRT, and a user defined custom keyboard.

Alternatively, in some embodiments, a multilevel sensor, such as a capacitive sensor or a resistive sensor can be used to construct the keyboard matrix. In various embodiments, capacitive sensors (switches) are used at 322*a*, 324*a*, 326*a*, etc. throughout the keyboard matrix. In one embodiment, to create a multilevel capacitive switch, the range of motion of a key and the corresponding change in capacitance is divided between a first state and a second state. The first state is used to detect finger presence and the second state is used to detect a key press for data input. In various embodiments, multilevel resistive switches (sensors) are used at 322*a*, 324*a*, 326*a*, etc. In one embodiment, a multilevel resistive switch is created by stacking two resistive switch layers on top of each other. Alternatively, two resistive switches are placed close enough to each other such that they are both triggered by a user's finger. In either implementation, one of the resistive switch layers is designed to trigger with a level of pressure that is less than a level of pressure necessary to trigger the other. The switch designed to trigger with the lesser pressure is used to sense finger presence while the one designed to close with the larger pressure is used for data input. In some embodiments, multilevel resistive switches are configured as described below in conjunction with FIG. 6 and FIG. 7.

Two level switches require the keyboard character reference chart 352 to be accessed twice, once when the first level of the switch is triggered and then a second time when the second level of the switch is triggered. For example, when a user presses the key 322*b* by a first amount the first level of the switch 322*a* is triggered. The keyboard character reference chart 352 is accessed for row, column indices (1, 1) at the first switch level, row 360 and column 380; retrieving $FP_Q$ at 382 indicating that finger presence is detected at the "Q" key. If the user pushes the key by a second amount (the second amount being greater than the first amount) then the second level of the switch is triggered. The keyboard character reference chart 352 is accessed at column 358 and a "Q" is retrieved at 362 corresponding to the data input for the pressed key.

Similarly, if the user presses the key 324*b* by a first amount, the first level of the switch 324*b* is triggered. The keyboard character reference chart 352 is accessed for row, column indices (1, 2) at the first switch level, row 364 and column 380; retrieving $FP_W$ at 384 indicating that finger presence is detected at the "W" key. If the user pushes the key by a second amount (the second amount being greater than the first amount) then the second level of the switch is triggered. The keyboard character reference chart 352 is accessed at column 358 and a "W" is retrieved at 366 corresponding to the data input for the pressed key.

Similarly, if the user presses the key 326*b* by a first amount, the first level of the switch 326*b* is triggered. The keyboard character reference chart 352 is accessed for row, column indices (1, 3) at the first switch level, row 368 and column 380; retrieving $FP_E$ at 386 indicating that finger presence is detected at the "E" key. If the user pushes the key by a second amount (the second amount being greater than the first amount) then the second level of the switch is triggered. The keyboard character reference chart 352 is accessed at column 358 and a "E" is retrieved at 370 corresponding to the data input for the pressed key With reference back to FIG. 2, on a continuous basis, keyboard encoder 206 communicates at 214 the status of the keyboard to keyboard controller 210, sending data over an interface, such as an interface designed to for use with PS/2, Universal Serial Bus (USB), or wireless interfaces such as Bluetooth, etc. Keyboard controller 210 or another processor communicates with the keyboard encoder 206 receiving keyboard status and data resulting from key presses as they occur for both finger presence signals and data signals or for just data signals, according to a configuration implemented in a particular embodiment. Keyboard controller 210 can be configured as a separate processor or the main central processing unit (CPU) of the data processing device can perform this function.

FIG. 4A illustrates, generally at 400, a process for communicating finger presence associations to a user, according to embodiments of the invention. With respect to FIG. 4A, a process starts at a block 402. The process proceeds to a block 404 where the keyboard status is analyzed by a finger presence generator. In a block 406 the finger presence generator determines which keys of the keyboard have a finger placed over a given key in order to obtain finger presence signals. Depending on the embodiment, placed "over" a given key ranges from (see four states described above) determining which key has been pressed to the point of registering a data input to determining if a user's finger is over a key but the key has not been pressed enough to register the data input. For example, in the case of an existing legacy keyboard the finger presence generator maintains a list of keys that are pressed to the point of registering a data input signal as described above in conjunction with FIG. 2. This list is continuously updated. In another embodiment, where two sensors are used per key location, the finger presence generator maintains a list of keys that a user's fingers are touching but which have not triggered data inputs. Two sensors per key location can be implemented with two sensors built into the keyboard per key location or by a finger presence overlay described in the discussion pertaining to the figures below. In yet other embodiments, where a sensor with two levels is used at each key location, the finger presence generator maintains a list of keys that a user's fingers are touching, thereby triggering the first level (indicating finger presence) but not necessarily the second level (indicating a data trigger), such embodiments were described above and are also described below in conjunction with the figures that follow. In yet other embodiments, such as in the case of a virtual keyboard constructed with an optical tracking camera and light-trigger plane (Appendix A herein), the finger presence generator maintains a list of keys corresponding to a user's fingers which have come within a predetermined range height (range height corresponds to a height off of the flat surface that the virtual keyboard has been projected onto).

At a block 408 the finger presence signals are associated with particular key locations on the keyboard. This is done according to the construct of a given keyboard. For keyboards configured around a keyboard matrix, such as described above in conjunction with FIG. 2, the row, column indices associated with detection of a pressed key provide the necessary coordinates to identify the key and the key character table is used to obtain the data input value of the pressed key. In other embodiments, such as with a virtual keyboard as described above, x, y coordinates for a finger position are used with a lookup table similar to 652 with the substitution of x, y position for row column indices m, n.

At a block 410 the associations are communicated to the user. In one embodiment, communication of the associations is performed by displaying a soft keyboard on a data display such as the one illustrated in FIG. 1B at 156 with the hot-keys indicated at 158. As used in this description of embodiments, hot-key refers to a key which has a user's finger over it. In conjunction with process 410, the soft keyboard is created with a display engine and keyboard data that is read from memory. Keyboard data includes the alpha-numeric values and functions assigned to keys of the keyboard, relative position of the keys (x, y location) on the keyboard. Other methods of communicating the hot-key associations to the user include audio message. The process stops at a block 412.

FIG. 4B illustrates, generally at 450, anther process for obtaining and displaying hot-key associations on a data display, according to embodiments of the invention. With reference to FIG. 4B, a process starts at a block 452. At a block 454 a keyboard status is analyzed. Following the block 454 control splits between a path 478 and a path 480. Following the path 478 at a block 456 finger presence signals are aggregated by a finger presence generator as described above. At a block 458 the finger presence signals are associated with the keys of a keyboard including the data necessary to place/display the key within the keyboard, e.g., x, y positions on the keyboard. At a block 460 finger presence associations are communicated to a user. Communication to a user includes presentation of hot-key associations in a region of a data display.

Following a path 480 at a block 462 input data is obtained from a keyboard when a key is pressed to trigger a data event for the key. At a block 464 input data is retrieved from memory as described above and as facilitated by look-up tables when necessary or by results obtained from algorithms in other cases such as with a virtual keyboard. At a block 466 input data is displayed within a data window of a data processing system's data display. This is done according to various examples; e.g., data input into a blind typing tutorial, a word processing application, spread sheet application, etc.

The key press events with triggered data inputs are in some embodiments passed at 482 to the block 460 of path 478 and are treated as finger presence signals by the block 460. In embodiments which have; two sensors per key location, a sensor with multilevel triggers, or algorithmically generated finger presence signal estimates along with key presses generating data inputs, both paths 478 and 480 operate concurrently to provide the user with finger presence associations for the relevant keys that a user's fingers are over at any point in time.

Exiting the path 478 control proceeds at 468 and the process is checked for an interrupt at 472. Similarly, following the path 480 control proceeds at 470 and the process is checked for an interrupt at 472. If an interrupt has been registered the process stops at 474. If no interrupt has been registered then control proceeds at 476 and the status of the keyboard is analyzed again at 454 and the process repeats thereby providing a continuous communication of the key of the keyboard that the user's fingers are over at any point in time.

Figure 5:
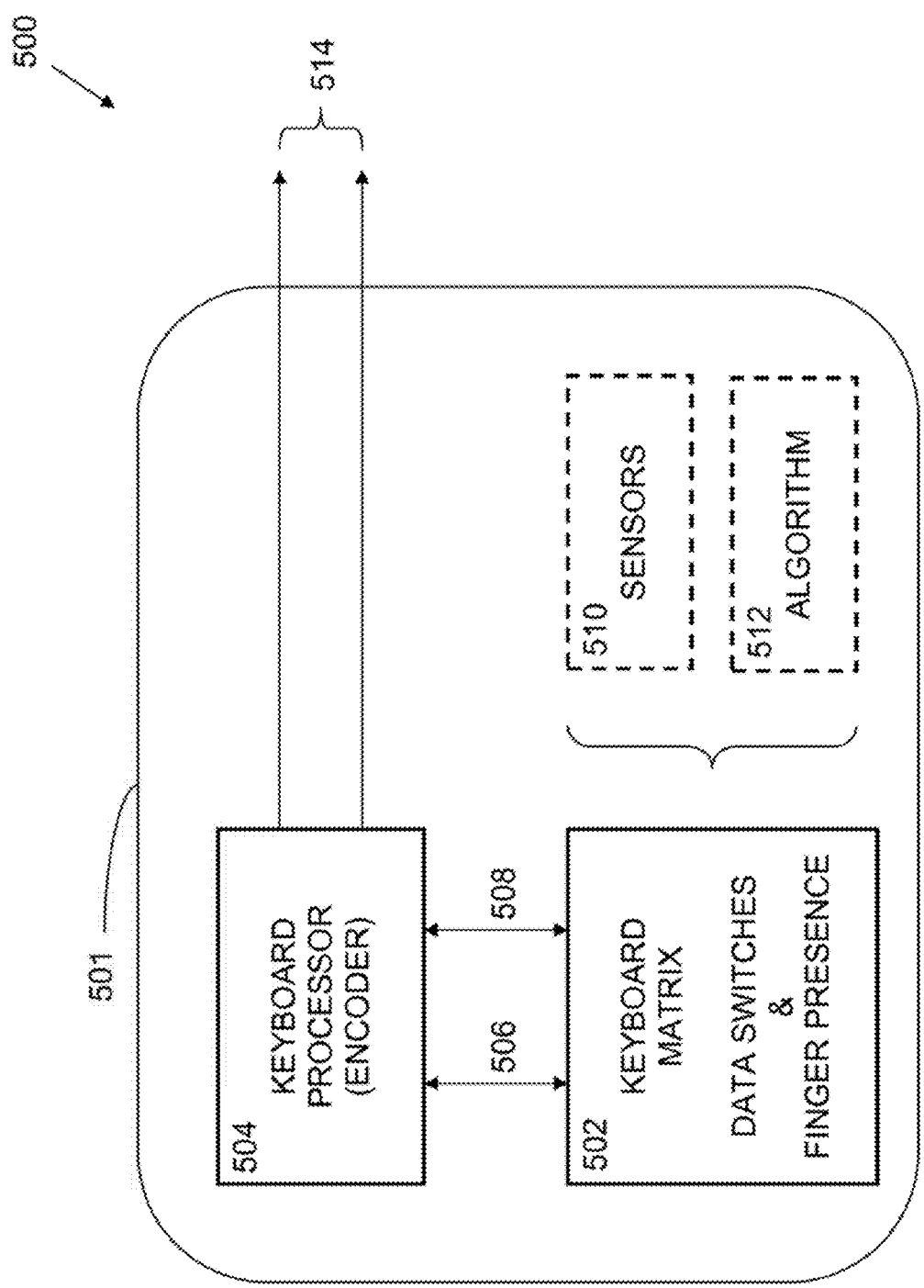
FIG. 5 illustrates a block diagram of a keyboard according to embodiments of the invention.

FIG. 5 illustrates, generally at 500, a block diagram of a keyboard according to embodiments of the invention. With reference to FIG. 5, a keyboard 501 has a keyboard matrix 502 including an array of sensors including sensors to provide for data input and sensors to provide for finger presence. Alternatively, in some embodiments, in place of the keyboard matrix 502, sensors 510 and algorithm 512 are used to provide data from keys of a keyboard and finger presence signals when a user's fingers are over the keys of the keyboard. Such a configuration is used with a virtual keyboard, such as described above using an optical sensing system, light source unit, keyboard template, and corresponding signal processing in algorithm 512. An example of such virtual keyboard functionality is contained in U.S. Pat. No. 8,497,841 by Sze et al. which is hereby incorporated by reference.

A keyboard processor 504 (also referred to as a keyboard encoder) interacts with the keyboard matrix 502 or alternatively sensors 510 and algorithm 512 to generate finger presence signals and key press signals for data input.

Key press signals corresponding to data input are indicated at 506 and finger presence signals are indicated at 508. Key press signals and finger presence signals are communicated to a data processing device as indicated at 514. In various embodiments, where a keyboard matrix is used in the implementation of a keyboard, the keyboard matrix 502 is configured with two sensors at each key location of the keyboard or the keyboard matrix is configured with a single multi-level sensor at each key location in a keyboard. In other embodiments, when a keyboard matrix is used with only one sensor at each key location key press events that trigger data input are also treated as finger presence signals as described above.

Figure 6:
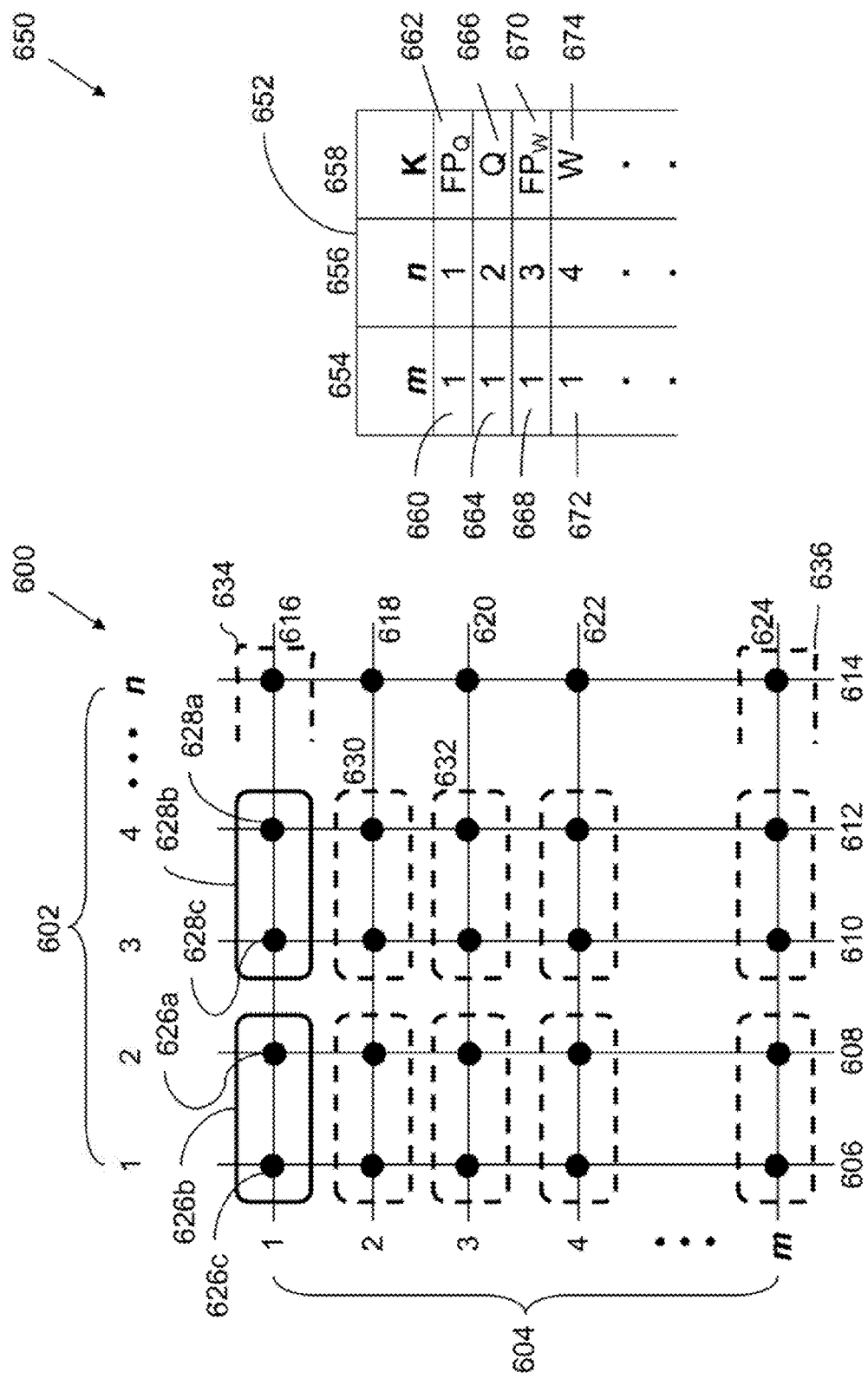
FIG. 6 illustrates a keyboard matrix configured to produce finger presence signals according to embodiments of the invention.

FIG. 6 illustrates, generally at 600, a keyboard matrix configured to generate finger presence signals according to embodiments of the invention. With reference to FIG. 6 a keyboard matrix is shown with a general number of m rows 604 and n columns 602. Each key of a keyboard will correspond with a crossing of one nominally horizontal and two nominally vertical conductive paths within a keyboard matrix as described below. In various embodiments a two level sensor or two sensors are used for each key of the keyboard.

For each of the n columns, a vertically oriented conductive path is created as illustrated by 606, 608, 610, 612, and 614. Similarly, for each of the m rows, a horizontally oriented conductive path is created as is illustrated by 616, 618, 620, 622 and 624. As described above, conductive paths 606, 608, 610, 612, 614, 616, 618, 620, 622, and 624 can be implemented in various ways with wires, conductive traces on a printed circuit board, etc. In one or more embodiments, a sensor (switch) is located at each intersection of a horizontal conductive path and two vertical conductive paths as indicated by solid circles, e.g., 626a and 626c in key 626b and 628a. 628c in key 628b (the remaining solid circles are not numbered for clarity within the illustration). A sensor (switch) is located at each solid circle. When mechanical switches are used, typically all switches are in the open state until a key is pressed. Along the first row, the first two switches 626a and 626c are associated with key 626b of a keyboard and to conductive paths 606, 608, and conductive path 616. Similarly, a switch 628a and a switch 628c are coupled to a key 628b of the keyboard and to conductive paths 610, 612, and conductive path 616. Other switches are indicated by dashed lines for example at 630, 632, 634, 636 as well as those that are not labeled for clarity of illustration.

A typical mode of operation of a keyboard is accomplished by a keyboard processor, also referred to as an encoder, such as 206 in FIG. 2 or 504 in FIG. 5 supplying a source of electrical power to the columns (conductive paths 606, 608, 610, 612, and 614) and sensing any power on the rows (conductive paths 616, 618, 620, 622, and 624) resulting from a completed circuit from a depressed key of the keyboard. With mechanical switches used in the open state (as default for non-depressed keys), the keyboard encoder typically supplies power by sequencing the power from one conductive path to the other. The keyboard encoder continuously senses for power on the rows (conductive paths 616, 618, 620, 622, and 624). When a user presses a key, such as for example 626b, by an amount sufficient to trigger a first switch, e.g., 626c electrical continuity is made between conductive path 606 and 616 and the pressed key is detected by the keyboard encoder as a finger presence signal, indicating that a user's finger is over key 626b of the keyboard. Pressing the key 626b further results in the sensor 626a logging a data input signal. Electrical continuity is made between conductive path 608 and 616 and the pressed key is detected by the keyboard encoder as a data input signal (command, or alpha-numeric input).

The keyboard encoder associates the pressed key with a keyboard character reference chart 652 to obtain a finger presence signal associated with the pressed key as well as the character or function associated with the pressed key. A keyboard character reference chart is illustrated generally at 650 in FIG. 6. A keyboard character reference chart can be implemented as a lookup table stored in memory, such as read only memory (ROM) accessible to the keyboard encoder. The keyboard character reference chart 652 has a first column 654 corresponding to a row index "m" of the keyboard matrix 600, a second column 656 corresponding to a column index "n" of the keyboard matrix 600, and the corresponding function value or data value is shown in column 658 with heading "K."

In one example, utilizing the well known QWERTY keyboard, the data values for first two text keys to the right of the "Tab" key (not shown) which are on the first row used for alpha input of a QWERTY keyboard are shown in column 658 with column heading "K." By way of example, when a user presses the key 626b by a first amount (sufficient to trigger sensor 626c), row, column indices (1, 1) are registered by the keyboard encoder during scanning of the keyboard matrix 600. Entering the keyboard reference chart 652 with row, column indices (1, 1) at row 660 corresponds with a finger presence signal $FP_Q$ as indicated at 662. When a user continues to press the key 626b by a second amount (which is greater than the first amount and sufficient to trigger sensor 626a), row, column indices (1, 2) are registered by the keyboard encoder during scanning of the keyboard matrix 600. Entering the keyboard reference chart 652 with row, column indices 1, 2 at row 664 and column 658 corresponds with a data value of "Q" as indicated at 666.

Similarly, when a user presses the key 628b by a first amount (sufficient to trigger sensor 628c), row column indices (1, 3) are registered by the keyboard encoder during scanning of the keyboard matrix 600. Entering the keyboard reference chart 652 with row, column indices (1, 3) at row 668 corresponds with a finger presence signal $FP_W$ as indicated at 670. When a user continues to press the key 628b by a second amount (which is greater than the first amount and sufficient to trigger sensor 628a), row, column indices (1, 4) are registered by the keyboard encoder during scanning of the keyboard matrix 600. Entering the keyboard reference chart 652 with row, column indices 1, 3 at row 672 and column 658 corresponds with a data value of "W" as indicated at 674.

In this example, since the "Shift" key was not pressed simultaneously the actual data values are lower case alpha characters, "q and w." Similar functionality of the keyboard with keys indicated with dashed lines such as 630, 632, 634, 636, etc. are used to enter chart 652 to retrieve the appropriate data value that represents alpha-numeric data or function for a given keyboard layout.

On a continuous basis, a keyboard encoder communicates the status of the keyboard to a keyboard controller, sending finger presence signals and key input data over various interfaces, such as those designed to use PS/2, Universal Serial Bus (USB), wireless interfaces such as Bluetooth, etc. The keyboard controller communicates with the keyboard encoder receiving keyboard status and inputting data resulting from key presses as they occur and communicating the finger presence signals to a user. As described above, a keyboard controller can be configured as a separate processor or the main central processing unit (CPU) of the data processing device can perform this function.

Figure 7:
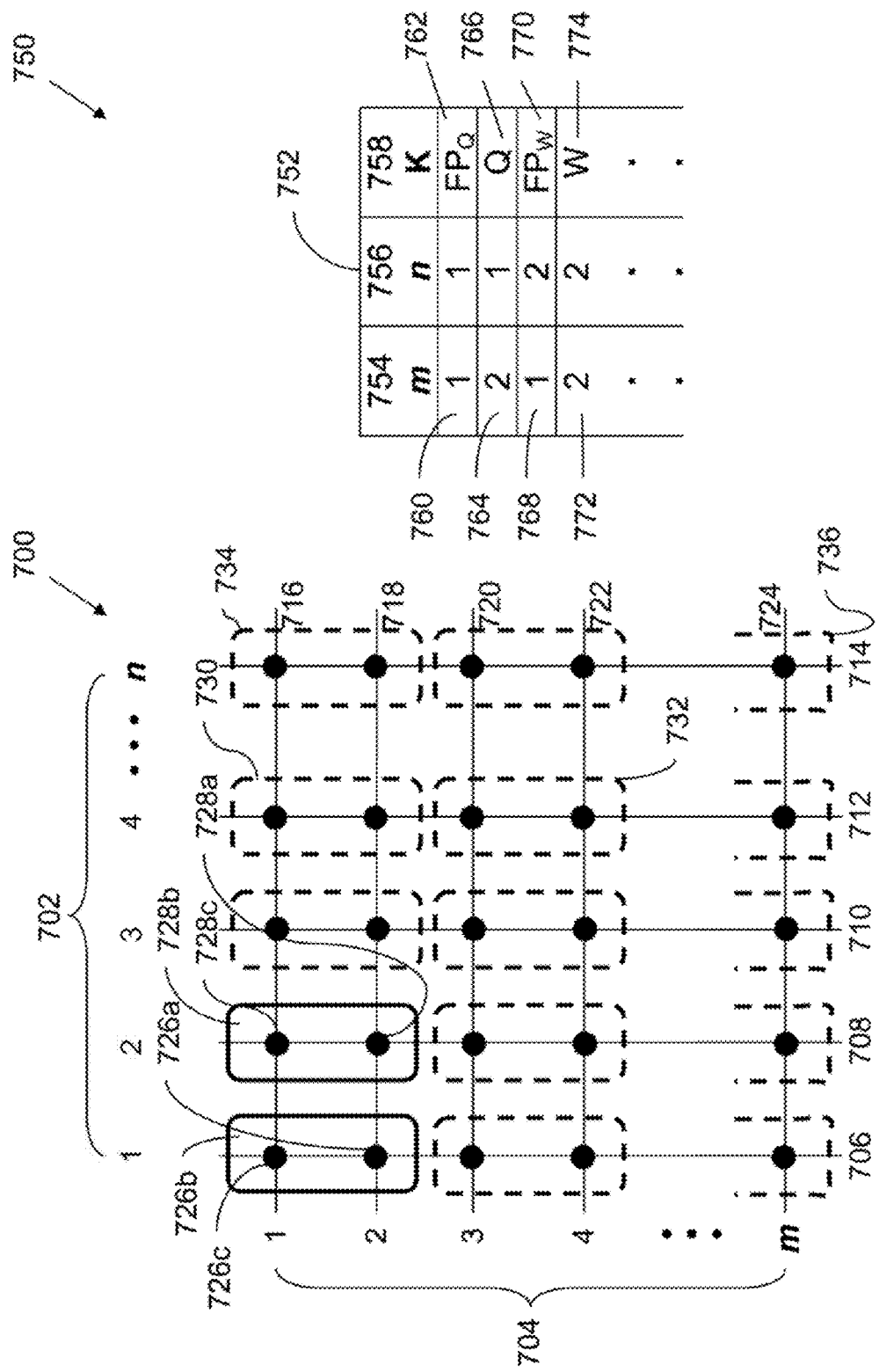
FIG. 7 illustrates another keyboard matrix configured to produce finger presence signals, according to embodiments of the invention.

FIG. 7 illustrates another keyboard matrix configured to generate finger presence signals according to embodiments of the invention. With reference to FIG. 7 a keyboard matrix is shown at 700 with a general number of m rows 704 and n columns 702. Each key of a keyboard will correspond with a crossing of two nominally horizontal and one nominally vertical conductive paths within a keyboard matrix as described below. In various embodiments a two level sensor or two sensors are used for each key of the keyboard.

For each of the an columns, a vertically oriented conductive path is created as illustrated by 706, 708, 710, 712, and 714. Similarly, for each of the m rows, a horizontally oriented conductive path is created as is illustrated by 716, 718, 720, 722 and 724. As described above, conductive paths 706, 708, 710, 712, 714, 716, 718, 720, 722, and 724 can be implemented in various ways with wires, conductive traces on a printed circuit board, etc. In one or more embodiments, a sensor (switch) is located at each intersection of two horizontal conductive paths and one vertical conductive path as indicated by solid circles, e.g., 726a and 726c in key 726b and 728a, 728c in key 728b (the remaining solid circles are not numbered for clarity within the illustration). A sensor (switch) is located at each solid circle. When mechanical switches are used, typically all switches are in the open state until a key is pressed. Along the first two rows, the first two switches 726a and 726c are associated with key 726b of a keyboard and to conductive paths 706 and conductive paths 716 and 718. Similarly, a switch 728a and a switch 728c are coupled to a key 728b of the keyboard and to conductive paths 716, 718 and to conductive path 708. Other switches are indicated by dashed lines for example at 730, 732, 734, and 736 as well as those that are not labeled for clarity of illustration.

A typical mode of operation of a keyboard is accomplished by a keyboard processor, also referred to as an encoder, such as 206 in FIG. 2 or 504 in FIG. 5 supplying a source of electrical power to the columns (conductive paths 706, 708, 710, 712, and 714) and sensing any power on the rows (conductive paths 716, 718, 720, 722, and 724) resulting from a completed circuit from a depressed key of the keyboard. With mechanical switches used in the open state (as default for non-depressed keys), the keyboard encoder typically supplies power by sequencing the power from one conductive path to the other. The keyboard encoder continuously senses for power on the rows (conductive paths 716, 718, 720, 722, and 724). When a user presses the key, such as for example 726b, by an amount sufficient to trigger a first switch, e.g., 726c electrical continuity is made between conductive path 706 and 716 and the pressed key is detected by the keyboard encoder as a finger presence signal, indicating that a user's finger is over key 726b of the keyboard. Pressing the key 726b further results in the sensor 726a logging a data input signal. Electrical continuity is made between conductive path 706 and 718 and the pressed key is detected by the keyboard encoder as a data input signal (command, or alpha-numeric input).

The keyboard encoder associates the pressed key with a keyboard character reference chart 752 to obtain a finger presence signal associated with the pressed key as well as the character or function associated with the pressed key. A keyboard character reference chart is illustrated generally at 750 in FIG. 7. A keyboard character reference chart can be implemented as a lookup table stored in memory, such as read only memory (ROM) accessible to the keyboard encoder. The keyboard character reference chart 752 has a first column 754 corresponding to a row index "m" of the keyboard matrix 700, a second column 756 corresponding to a column index "n" of the keyboard matrix 700 and the corresponding function value or data value is shown in column 758 with heading "K."

In one example, utilizing the well known QWERTY keyboard, the data values for first two text keys to the right of the "Tab" key (not shown) which are on the first row used for alpha input of a QWERTY keyboard are shown in column 758 with column heading "K." By way of example, when a user presses the key 726b by a first amount (sufficient to trigger sensor 726c), row, column indices (1, 1) are registered by the keyboard encoder during scanning of the keyboard matrix 700. Entering the keyboard reference chart 752 with row, column indices (1, 1) at row 760 corresponds with a finger presence signal $FP_Q$ as indicated at 762. When a user continues to press the key 726b by a second amount (which is greater than the first amount and is sufficient to trigger sensor 726a), row, column indices (2, 1) are registered by the keyboard encoder during scanning of the keyboard matrix 700, entering the keyboard reference chart 752 with row, column indices (2, 1) at 764 correspond with a data value of "Q" as indicated at 766.

Similarly, when a user presses the key 728b by a first amount (sufficient to trigger sensor 728c), row, column indices (1, 2) are registered by the keyboard encoder during scanning of the keyboard matrix 700. Entering the keyboard reference chart 752 with row, column indices (1, 2) at row 768 corresponds with a finger presence signal $FP_W$ as indicated at 770. When a user continues to press the key 728b by a second amount (which is greater than the first amount and sufficient to trigger sensor 728a, row, column indices (2, 2) are registered by the keyboard encoder during scanning of the keyboard matrix 700, entering the keyboard reference chart 752 with row, column indices (2, 2) at 772 correspond with a data value of "W" as indicated at 774.

In this example, since the "Shift" key was not pressed simultaneously the actual data values are lower case alpha characters, "q and w." Similar functionality of the keyboard with keys indicated with dashed lines such as 730, 732, 734, 736, etc. are used to enter chart 752 to retrieve the appropriate data value that represents alpha-numeric data or function for a given keyboard layout.

On a continuous basis, a keyboard encoder communicates the status of the keyboard to a keyboard controller, sending finger presence signals and key input data over various interfaces, such as those designed to use PS/2, Universal Serial Bus (USB), wireless interfaces such as Bluetooth, etc. The keyboard controller communicates with the keyboard encoder receiving keyboard status and inputting data resulting from key presses as they occur and communicating the finger presence signals to a user. As described above, a keyboard controller can be configured as a separate processor or the main central processing unit (CPU) of the data processing device can perform this function.

Figure 8A:
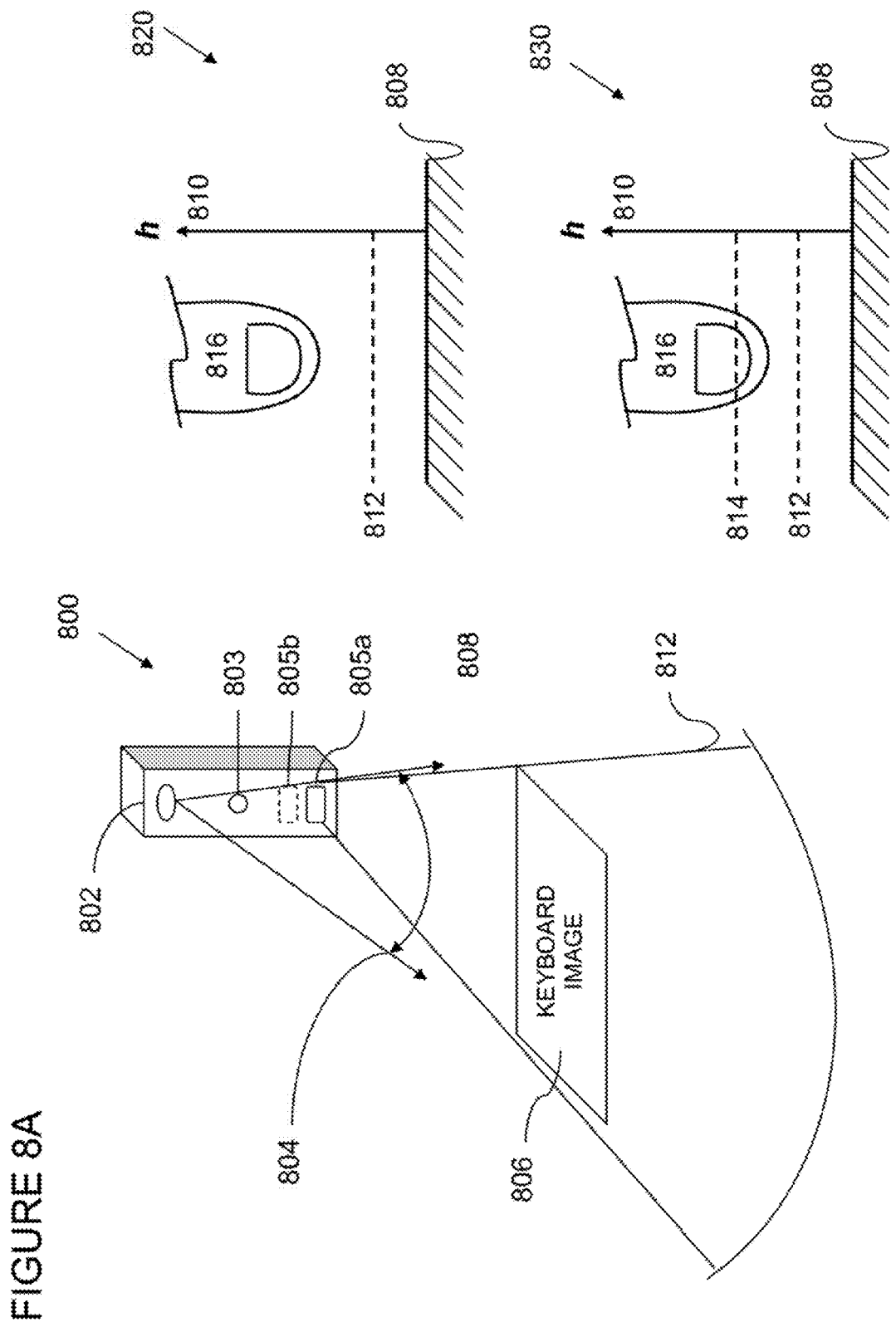
FIG. 8A illustrates a virtual keyboard according to embodiments of the invention.

FIG. 8A illustrates, generally at 800, a virtual keyboard according to embodiments of the invention. With reference to FIG. 8A, a virtual keyboard unit 802 uses a laser to project an image of a keyboard 806 onto a flat surface 808. The laser beam scans across an aperture 804 while projecting the keyboard 806.

A light source unit 805*a* projects a thin fan shaped beam of light 812 above the flat surface 808. An optical sensing system 803 receives light scattered from an object, such as a user's finger, when the object is within the detectable area of the optical sensing system 803. The detectable area is any area above the flat surface 808 in which the image sensing system 803 can detect an object. The thin fan shaped beam of light 812 is spaced above the flat surface 808 by a distance of approximately 3 to 10 millimeters (mm).

A processor associated with virtual keyboard unit 802 (which can also be located in a data processing device to which 802 is in communication) processes the images of the user's fingers with a detection algorithm together with information on whether the horizontal beam of light has been intersected by the user's finger in order to determine whether a key press has occurred. Other parameters of the image of the user's finger are analyzed to determine whether a key press has occurred such as finger tip area changes, etc. The operation of a virtual keyboard is more completely contained in Appendix A herein.

The light source unit 805*a* emits the thin fan shaped beam of light 812 in a frequency range such as the infrared (IR) range (700 nm~1,400 nm). The optical sensing system 803 is angled with a view of the virtual keyboard 806 and continuously senses a user's activities in the detectable area.

A side view parallel to the flat surface 808 is shown in 820. Axis 810 indicates a direction perpendicular to the flat surface 808. The thin fan shaped beam of light 812 is projected parallel to the flat surface 808. When a user's finger such as 816 is above the flat surface 808 and is within the detectable area of the optical sensing system 803 an image of the user's finger 816 is captured and interpreted as a finger presence signal. In some embodiments, when a user's finger 816 intersects (interacts with) the beam of light 812 by moving closer to the flat surface 808 the image captured by the optical sensing system 803 is also interpreted as a finger presence signal and as a data input signal indicating key press or key down has occurred.

In some embodiments, a second light source unit 805*b* emits a thin fan shaped beam of light 814 at an elevation above the thin fan shaped beam of light 812. The side view parallel to the flat surface 808 from 820 is shown again in 830 with the second thin fan shaped beam of light illustrated as a dashed line 814. The light source unit 805*b* emits the thin fan shaped beam of light 814 in a frequency range such as the infrared (IR) range (700 nm~1,400 nm). The optical sensing system 803 is angled with a view of the virtual keyboard 806 and continuously senses a user's activities in a detectable area relative to light received from the second light source unit 805*b*.

As in 820, the axis 810 illustrated in 830 indicates a direction perpendicular to the flat surface 808. Note that in 830 the user's finger 816 has moved closer to the flat surface 808 and has intercepted the beam of light 814 which is used to detect finger presence and to output a finger presence signal. When a user's finger passes through 812 and is at an elevation between 808 and 812 a key press is registered by the virtual keyboard processing unit.

In some embodiments, the light source unit 805*a* and 805*b* are alternatively pulsed as a function of time so that they both are not illuminating the detectable area at the same time. Pulsing as taught herein keeps the reflections of the beam from the user's fingers separate and prevents confusing the results one from the other.

Following the determination of finger presence in the detectable area the corresponding key location is determined and as well the command or alpha-numeric data associated with the key is retrieved from data tables associated with the virtual keyboard. The finger presence data are processed as described above with the processes of FIG. 4A or FIG. 4B and the finger presence associations are communicated to a user on for example a data display with a soft keyboard using hot-keys to correspond to the keys of the virtual keyboard over which a user's fingers are located.

Figure 8B:
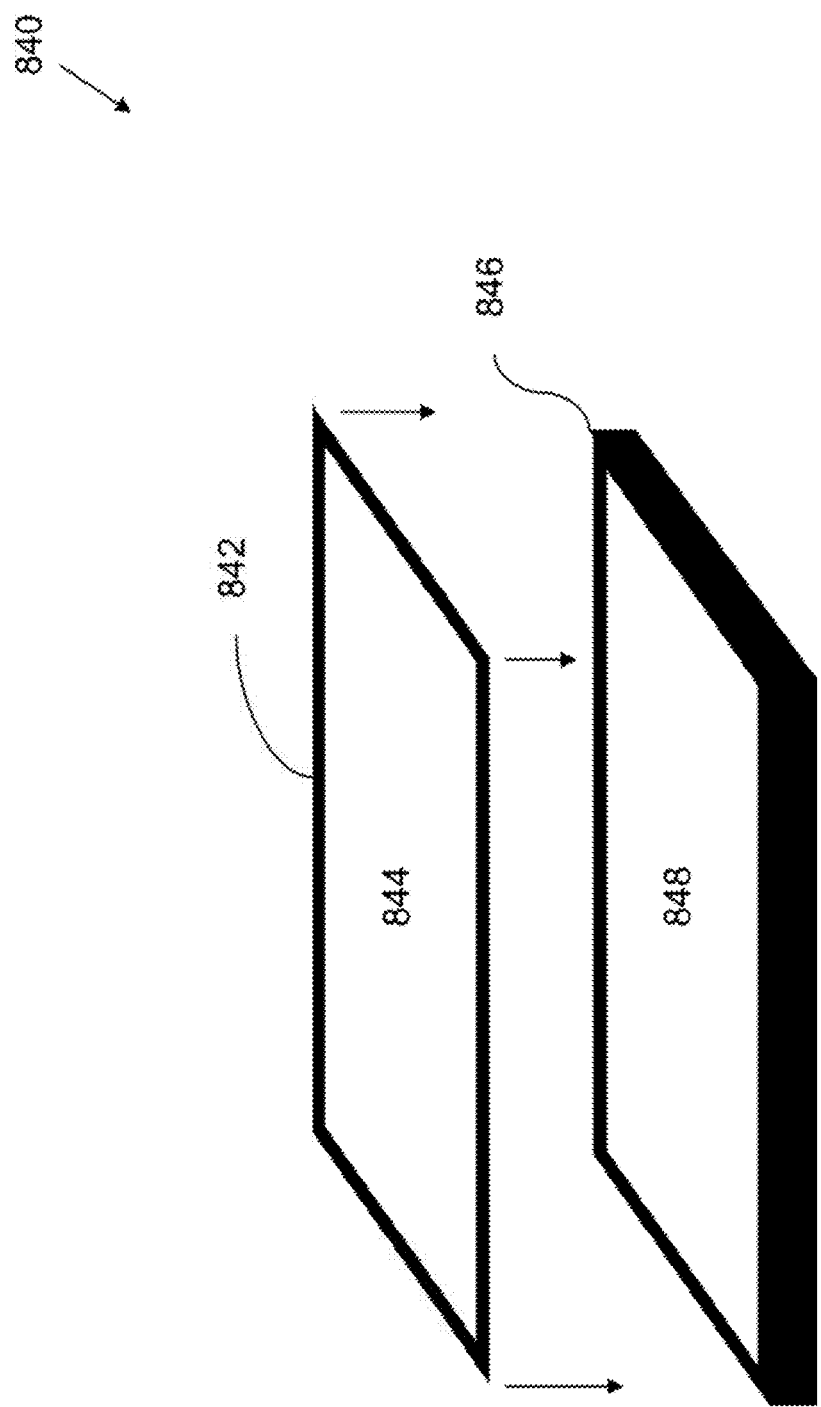
FIG. 8B illustrates a finger presence overlay keyboard according to embodiments of the invention.

FIG. 8B illustrates, generally at 840, a finger presence overlay keyboard according to embodiments of the invention. With reference to FIG. 8B, a finger presence keyboard overlay 842 is adapted to fit over an existing legacy keyboard 846. The finger presence overlay keyboard 842 has a set of keys that match the layout of the keys 848 on the keyboard 846. In one embodiment, the finger presence overlay keyboard 842 is a thin flexible keyboard utilizing membrane switches at each key location. When a user touches a finger to a key 844 on the keyboard 842 a finger presence signal is generated. A trigger level for the keys of the membrane keyboard 842 is designed to provide a finger presence signal with an application of force which is less than a force level needed to trigger a key of the keys 848 necessary to cause a data input to be registered from the keyboard 846.

Figure 8C:
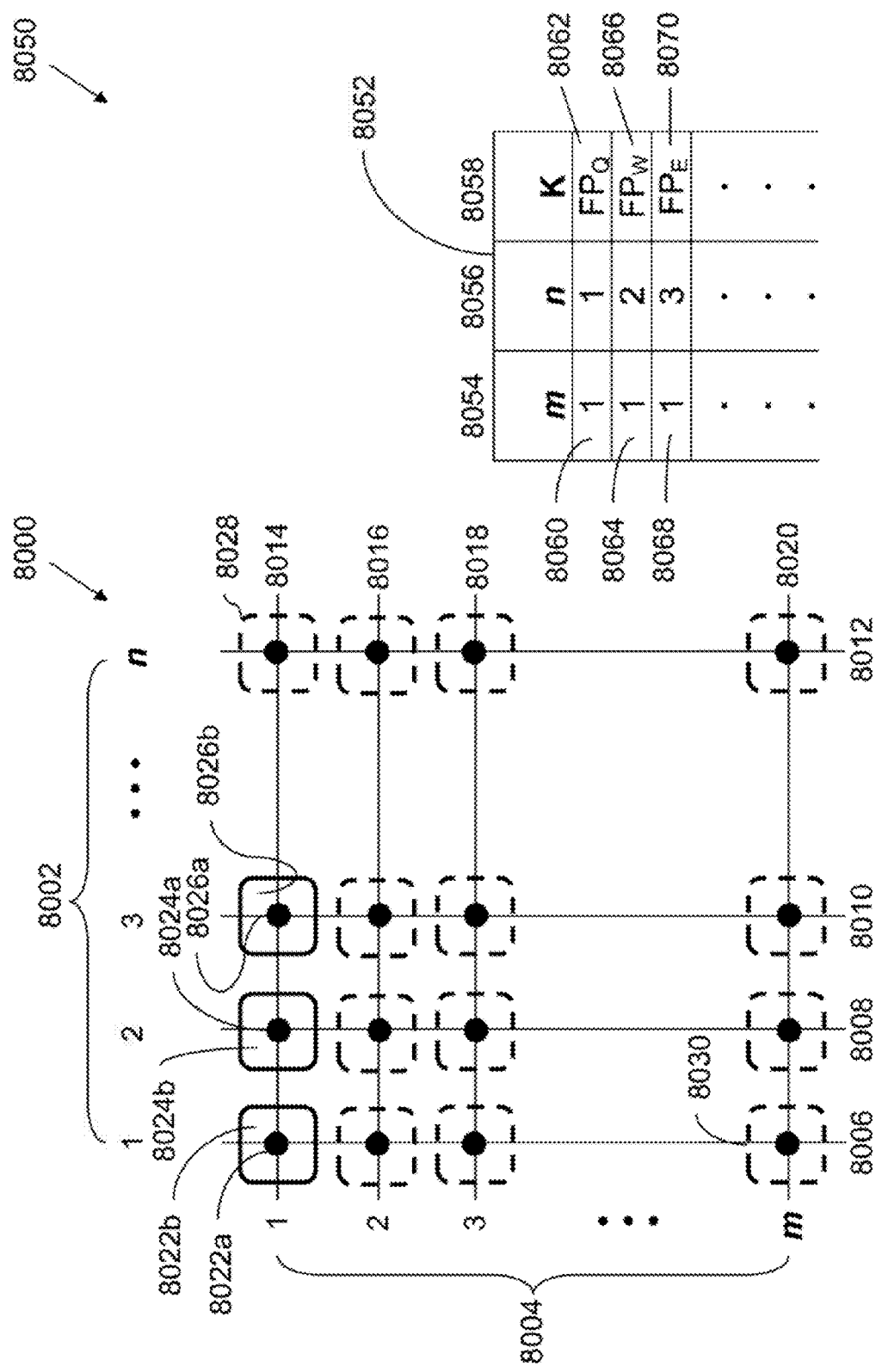
FIG. 8C illustrates a keyboard matrix configured to generate finger presence overlay signals, according to embodiments of the invention

FIG. 8C illustrates a keyboard matrix configured to generate finger presence signals according to embodiments of the invention. With reference to FIG. 8C, a general representation 8000 of a keyboard matrix is shown with a general number of m rows 8004 and n columns 8002. As described above each key of a keyboard will correspond with a crossing of a nominally horizontal and a nominally vertical conductive path within a keyboard matrix as described below. In one or more embodiments, the structures described in FIG. 8C correspond to the membrane keyboard described above in FIG. 8B.

For each of the n columns, a vertically oriented conductive path is created as illustrated by 8006, 8008, 8010, and 8012. Similarly, for each of the m rows, a horizontally oriented conductive path is created as is illustrated by 8014, 8016, 8018, and 8020. Conductive paths 8006, 8008, 8010, 8012, 8014, 8016, 8018, and 8020 can be implemented in various ways with wires, conductive traces on a printed circuit board, etc. Typically, a sensor (switch) is located at each place where a horizontal and vertical path cross as indicated by solid circles, e.g., 8022*a*, 8024*a*, and 8026*a* (the remaining solid circles are not numbered for clarity within the illustration). A sensor (switch) is located at each solid circle. When mechanical switches are used, typically all switches are in the open state until a key is pressed. Alternatively, when capacitive switches (sensors) are used current flows through the whole keyboard matrix. When a key is pressed the capacitive switch causes the current flow to change. The processor senses this change and interprets it as a key press. In other embodiments a resistive switch element is used to sense a key press. A trigger level for the sensors used in the keyboard matrix 8000 is selected to be less than a trigger level used in the legacy keyboard that overlay keyboard is used with. This ensures that a finger presence signal is obtained from the overlay keyboard before a force level rises to a point necessary to trigger the data input key of the legacy keyboard.

Along the first row of the keyboard matrix 8000, the first three switches and conductive paths are configured as follows. A switch 8022*a* is coupled to a key 8022*b* of a keyboard and to conductive path 8006 and conductive path

8014. Similarly, a switch 8024*a* is coupled to a key 8024*b* of the keyboard and to conductive path 8008 and conductive path 8014. Similarly, a switch 8026*a* is coupled to a key 8026*b* of the keyboard and to conductive path 8010 and conductive path 8014.

A typical mode of operation of a keyboard is accomplished by a keyboard processor, also referred to as an encoder supplying a source of electrical power to the columns (conductive paths 8006, 8008, 8010, and 8012) and sensing any power on the rows (conductive paths 8014, 8016, 8018, and 8020) resulting from a completed circuit from a depressed key of the keyboard. With mechanical switches used in the open state (as default for non-depressed keys), the keyboard encoder typically supplies power by sequencing the power from one conductive path to the other. The keyboard encoder continuously senses for power on the rows (conductive paths 8014, 8016, 8018, and 8020). When a user presses the key, such as for example 8022*b*, electrical continuity is made between conductive path 8006 and 8014 and the pressed key is detected by the keyboard encoder.

A keyboard encoder associates the pressed key with a keyboard character reference chart 8052 to obtain the character or function associated with the pressed key. A keyboard character reference chart is illustrated generally at 8050 in FIG. 8C. A keyboard character reference chart can be implemented as a lookup table stored in memory, such as read only memory (ROM) accessible to the keyboard encoder. The keyboard character reference chart 8052 has a first column 8054 corresponding to a row index "m" of the keyboard matrix 8000, a second column 8056 corresponding to a column index "n" of the keyboard matrix 8000, the corresponding function value or data value is shown in column 8058 with heading "K."

In one non-limiting example, utilizing the well known QWERTY keyboard, finger presence signals for the first three text keys to the right of the "Tab" key (not shown) which are on the first row used for alpha input with a QWERTY keyboard are shown in column 8058 with column heading "K." By way of example, when a user presses the key 8022*b* (sufficient to trigger sensor 8022*a*), row column indices (1, 1) are registered by the keyboard encoder during scanning of the keyboard matrix 8000. Entering the keyboard reference chart 8052 with row, column indices (1, 1) at row 8060 corresponds with a finger presence value of "$FP_Q$" as indicated at 8062. Similarly, when a key 8024*b* is pressed by the user (sufficient to trigger sensor 8026*a*), current flows from conductive path 8008 to conductive path 8014 and is sensed by the keyboard encoder. Entering the keyboard reference chart 8052 with row, column indices (1, 2) at row 8064 correspond with a finger presence value of "$FP_W$" as indicated at 8066. Similarly, when a key 8026*b* is pressed by the user, current flows from conductive path 8010 to conductive path 8014 and is sensed by the keyboard encoder. Entering the keyboard reference chart 8052 with row, column indices (1, 3) at row 8068 corresponds with a finger presence value of "$FP_E$" as indicated at 8070. In this example as before, since the "Shift" key was not pressed simultaneously the actual data values are lower case alpha characters. "q, w, and e." Similar functionality of the keyboard with keys indicated with dashed lines such as 8028, 8030, etc. are used to enter chart 8052 to retrieve the appropriate finger presence value.

The example above is directed to the QWERTY keyboard, however embodiments of the invention are readily implemented with any keyboard design such as but not limited to QWERTY, AZERTY, Dvorak, ABCDE, XPeRT, and a user defined custom keyboard.

The overlay keyboard is typically configured with its own keyboard controller and is typically controlled as part of an application running on a processor (keyboard controller) associated with the data processing device that it is being used with. On a continuous basis, the keyboard encoder communicates the status of the keyboard to the processor, sending data over an interface, such as, for example; PS/2, Universal Serial Bus (USB), wireless interfaces such as Bluetooth, etc. The keyboard controller communicates with the keyboard encoder receiving keyboard status and inputting data resulting from key presses as they occur for detecting finger presence. The keyboard controller can be configured as a separate processor or the main central processing unit (CPU) of the data processing device can perform this function.

Figure 9A:
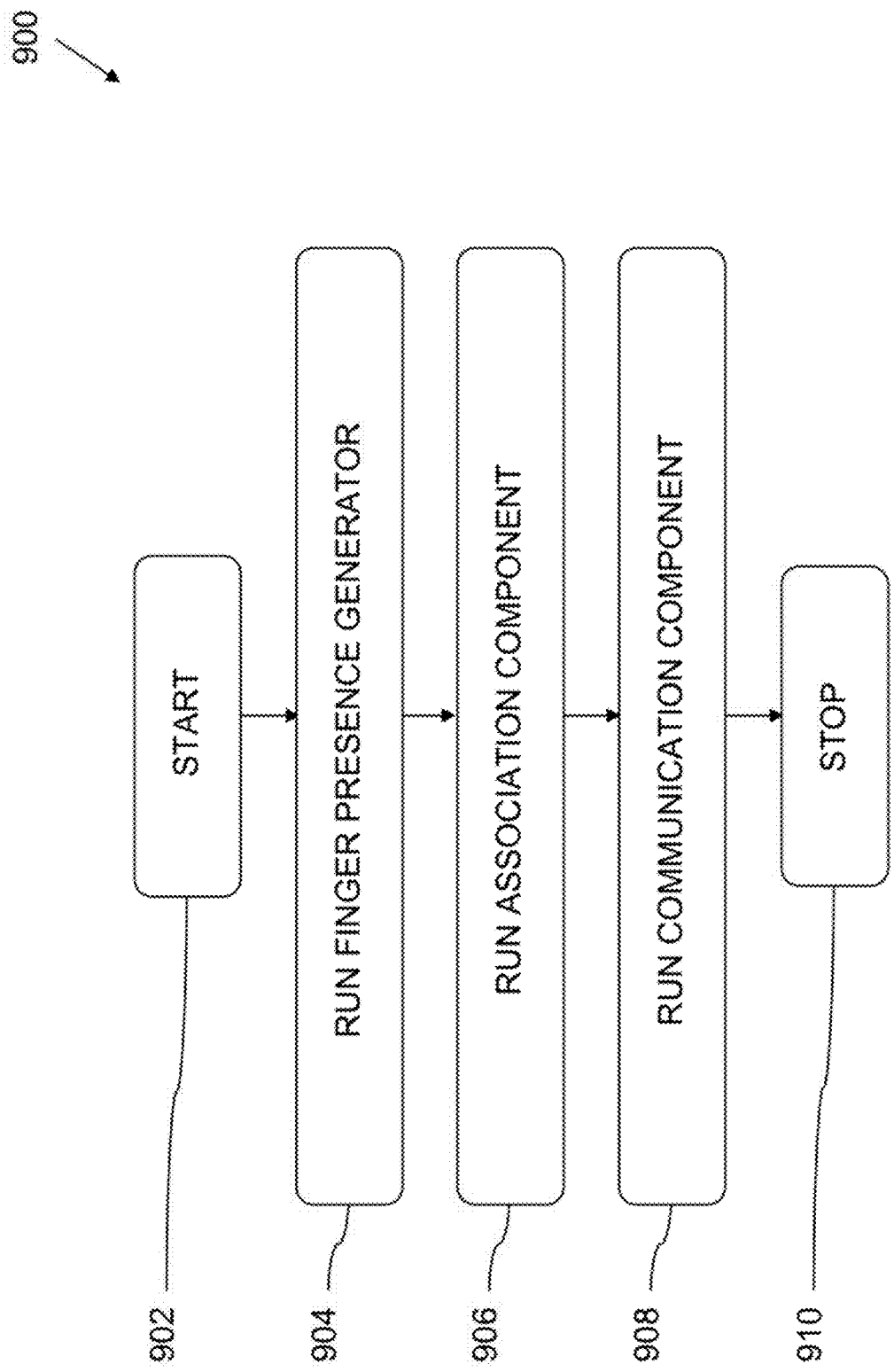
FIG. 9A illustrates processes according to embodiments of the invention.

FIG. 9A illustrates, generally at 900, a process block diagram according to embodiments of the invention. With reference to FIG. 9A, a process commences at a block 902. At a block 904 as described in conjunction with the figures above, a processor runs a finger presence generator that generates finger presence signals from a keyboard. In various embodiments a keyboard can be a legacy keyboard or a keyboard configured to provide separate finger presence signals. In various embodiments, in several non-limiting examples finger presence signals are derived from but not limited to, single level switches (legacy keyboards) multilevel switches, multiple switches, interactive switches (e.g., from a virtual keyboard tracking system), etc.

At a block 906 a processor runs an association component to associate finger presence signals with key locations of a keyboard. In some embodiments, where a keyboard matrix is used, as described above, a keyboard character reference chart is accessed using values stored in memory (which can be implemented via look-up tables) to provide the information pertaining to the relevant keys of the keyboard, thereby facilitating the associations.

At a block 908 a processor runs a communication component to communicate the associations to a user. At a block 910 the process stops.

Figure 9B:
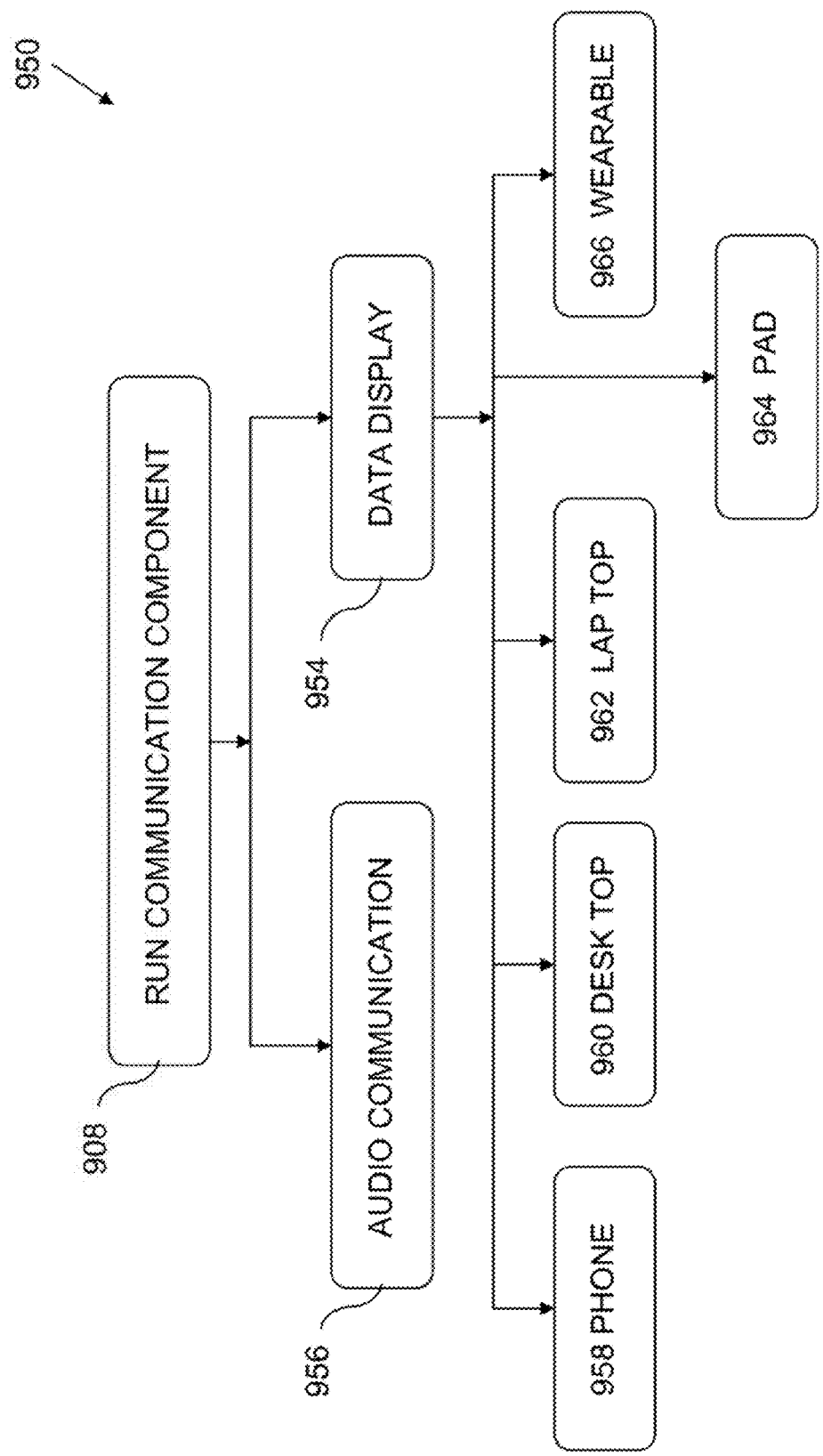
FIG. 9B illustrates communicating an association according to embodiments of the invention.

FIG. 9B illustrates, generally at 950, communicating an association according to embodiments of the invention. With reference to FIG. 9B, the communication component 908 can include a display engine that displays associations between a user's fingers and the keys of the keyboard on a data display at 954. As used in this description of embodiments, data display can be any data display configured for use with any data processing device or system. In various embodiments, a non-limiting list of data displays includes data displays used with a telephone 958, a desk top computer 960, a laptop computer 962, a tablet computer 964, a wearable computer 966, etc.

In some embodiments, the communications component 908 includes audio communication 956 which takes the form of audible instructions provided to the user based on analysis of the associations.

Figure 10:
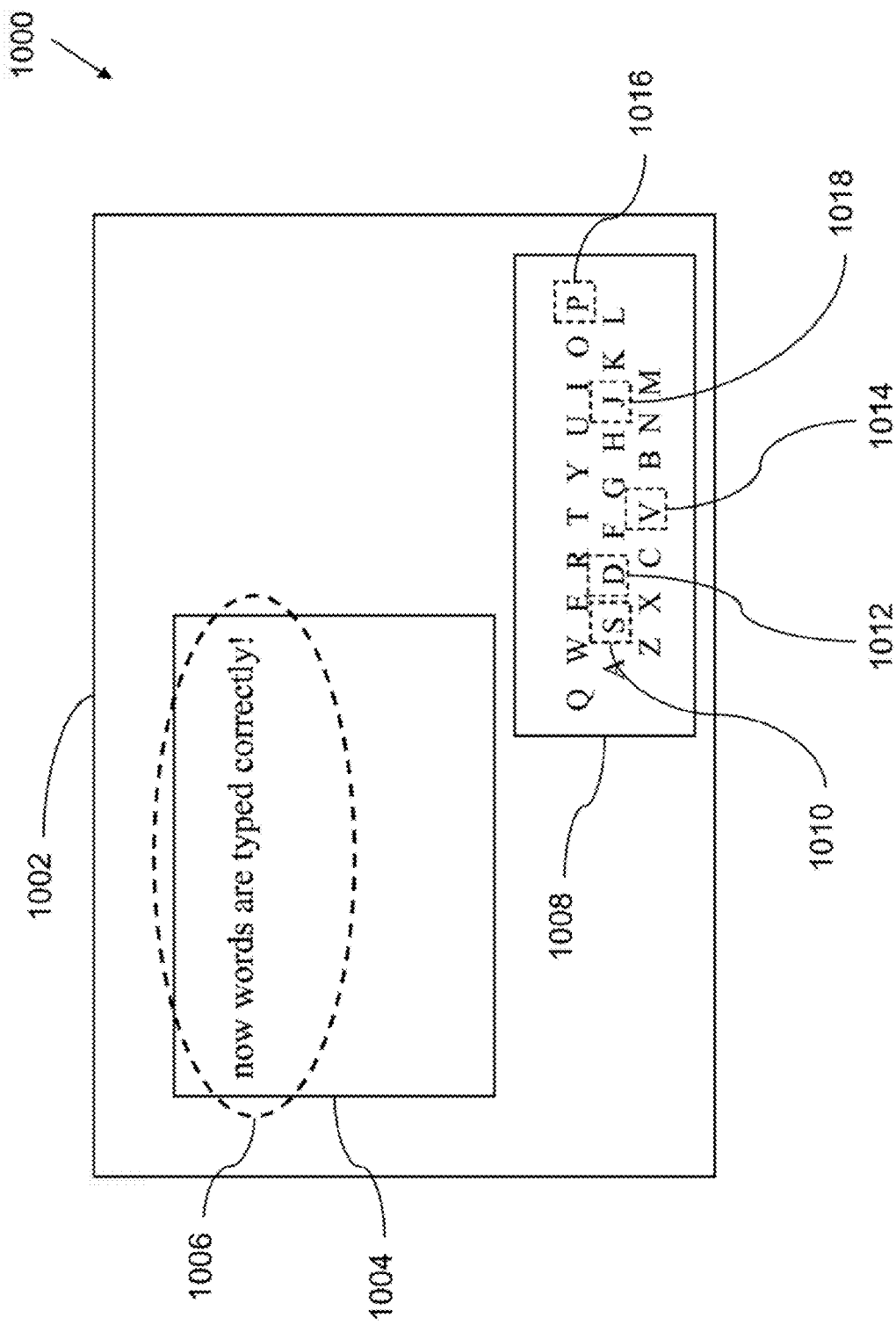
FIG. 10 illustrates a data display communicating finger presence associations according to embodiments of the invention.

FIG. 10 illustrates, generally at 1000, a data display communicating finger presence associations according to embodiments of the invention. With reference to FIG. 10, a data display 1002 is connected to a data processing device. In some embodiments, a display engine presents, within a region (window) of the data display, a graphical representation of the keyboard 1008 (soft keyboard) with finger presence associations thereon, i.e., 1010, 1012, 1014, 1016, and 1018. The finger presence associations are presented in a form that distinguishes them from the other keys which do not have a finger presence association at that instant of time. In various embodiments, a non-limiting list of forms in which the finger presence associations can be presented, include, but are not limited to: highlighting a key, displaying a key in a different color, blinking a color of a key, blinking highlighting of a key. In general, the finger presence association can be communicated in any way that changes a feature associated with the appearance of a key (on the soft keyboard) so that attention is called to that key.

Commonly, keyboards are used for learning to touch type (blind typing), learning a new keyboard layout or for inputting data into an application such as a word processing application or a spread sheet application, etc. In such cases, within the data display 1002, a window 1004 runs the application that the user is inputting data into via the keyboard. As the user types on the keyboard, the region 1008 provides continuously updated on screen feedback concerning the user's finger position on the keyboard. This information helps to shorten the blind typing learning curve. Thus, a user benefiting from embodiments described herein might type the message "now words are typed correctly" as displayed at 1006 without error or with less error than if window 1008 were not available.

Figure 11:
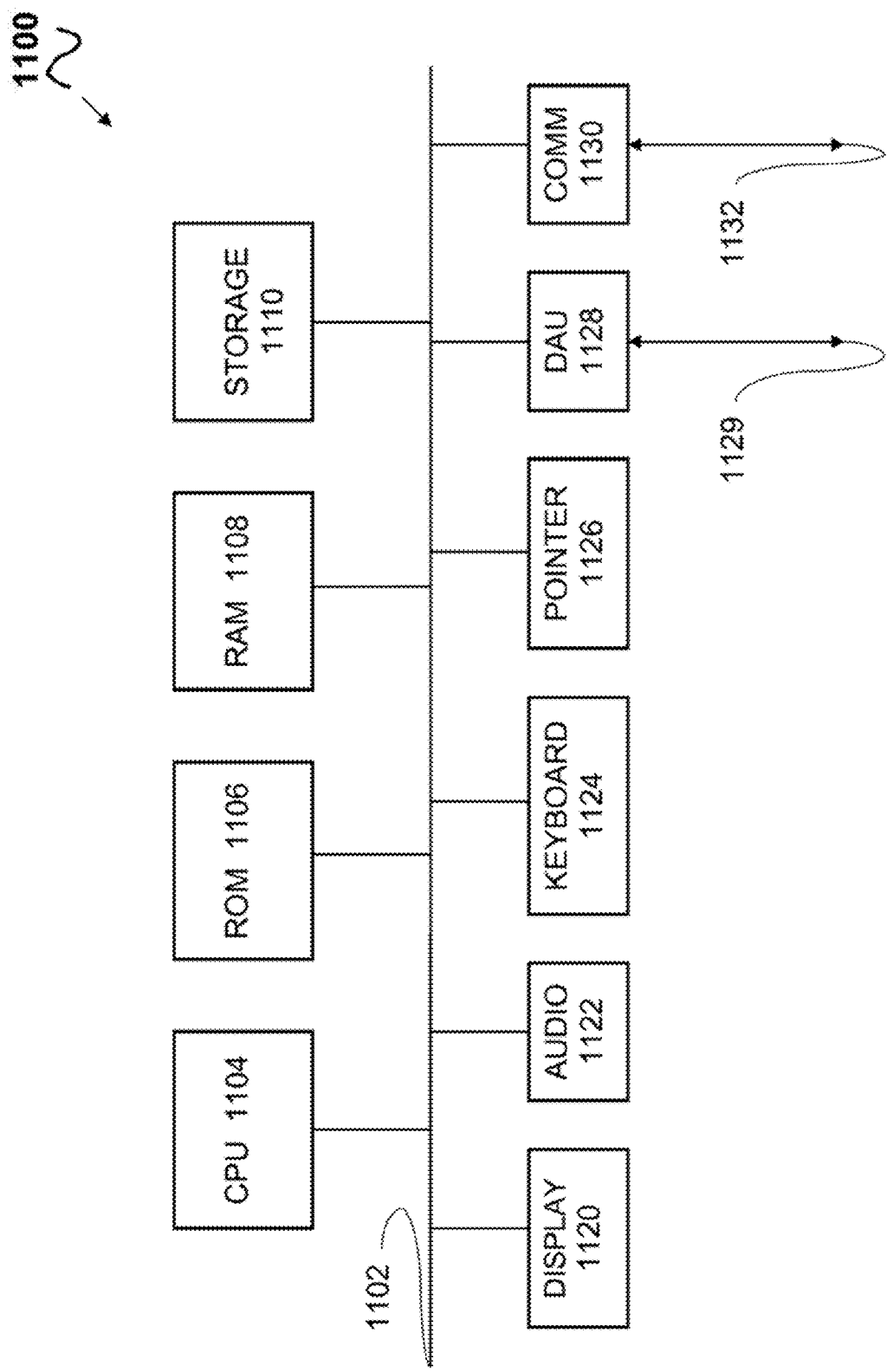
FIG. 11 illustrates a data processing system according to embodiments of the invention.

FIG. 11 illustrates, generally at 1100, a data processing system in which embodiments of the invention may be used. The block diagram is a high-level conceptual representation and may be implemented in a variety of ways and by various architectures. With reference to FIG. 11, bus system 1102 interconnects a Central Processing Unit (CPU) 1104, Read Only Memory (ROM) 1106, Random Access Memory (RAM) 1108, storage 1110, display 1120, audio 1122, keyboard 1124, pointer 1126, data acquisition unit (DAU) 1128, and communications 1130. The bus system 1102 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), or a dedicated bus designed for a custom application, etc. The CPU 1104 may be a single, multiple, or even a distributed computing resource or a digital signal processing (DSP) chip. Storage 1110 may be Compact Disc (CD), Digital Versatile Disk (DVD), hard disks (HD), optical disks, tape, flash, memory sticks, video recorders, etc. The data processing system 1100 can be used to generate and receive finger presence signals and to perform finger presence associations in conjunction with the preceding figures. Note that depending upon the actual implementation of the data processing system, the data processing system may include some, all, more, or a rearrangement of components in the block diagram. In some embodiments, aspects of the system 1100 are performed in software. While in some embodiments, aspects of the system 1100 are performed in dedicated hardware such as a digital signal processing (DSP) chip, etc. as well as combinations of dedicated hardware and software as is known and appreciated by those of ordinary skill in the art.

Thus, in various embodiments, data is received at 1129 for processing by the data processing system 1100. Such data can be transmitted at 1132 via communications interface 1130 for further processing in a remote location. Connection with a network, such as an intranet or the Internet is obtained via 1132, as is recognized by those of skill in the art, which enables the data processing system 1100 to communicate with other data processing devices or systems in remote locations.

For example, embodiments of the invention can be implemented on a computer system 1100 configured as a desktop computer or work station, on for example a WINDOWS® compatible computer running operating systems such as WINDOWS® 7, WINDOWS® 8, WINDOWS® 9, WINDOWS® XP Home or WINDOWS® XP Professional, Linux, Unix, etc. as well as computers from APPLE COMPUTER, Inc. running operating systems such as OS X, etc. Alternatively, or in conjunction with such an implementation, embodiments of the invention can be configured with devices such as speakers, earphones, video monitors, etc. configured for use with a Bluetooth communication channel. In yet other implementations, embodiments of the invention are configured to be implemented by mobile devices such as a smart phone, a tablet computer, a wearable device, such as eye glasses, a near-to-eye (NTE) headset, or the like.

For purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, waveforms, data, time series or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk read-only memories (CD-ROMs), and magnetic-optical disks, read-only memories (ROMs), random access memories (RAMs), electrically programmable read-only memories (EPROM)s, electrically erasable programmable read-only memories (EEPROMs). FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. In other examples, embodiments of the invention as described above in FIG. 1A through FIG. 11 can be implemented using a system on a chip (SOC), a Bluetooth chip, a digital signal processing (DSP) chip, a codec with integrated circuits (ICs) or in other implementations of hardware and software.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, mathematical expression, flow diagram or flow chart. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Non-transitory machine-readable media is understood to include any mechanism for storing information in a form readable by a machine (e.g., a computer). For example, a machine-readable medium, synonymously referred to as a computer-readable medium, includes read only memory (ROM); random access memory (RAM); magnetic disk storage media; optical storage media; flash memory devices; except electrical, optical, acoustical or other forms of transmitting information via propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A method for use with a data processing device to detect finger presence above a key, the method comprising:
providing a first fan shaped beam of light above a working area at a first elevation, the working area including indicia of a virtual keyboard having a plurality of keys, the first fan shaped beam of light can be used to detect a selected key;
providing a second fan shaped beam of light substantially parallel to and above the working area at a second elevation, the second elevation is larger than the first elevation, the second fan shaped beam of light is used to detect finger presence;
capturing images of the working area with an image capture device, the image capturing device is positioned above the second fan shaped beam of light and captures images of light from the second fan shaped beam of light;
detecting a presence of a user's finger above a key of the plurality of keys from light measured during the capturing; and
outputting an identification of the key obtained during the detecting to the data processing device.

2. The method of claim 1, further comprising:
alternating in time a pulsed output in time for the first fan shaded beam of light and the second fan shaped beam of light.

3. The method of claim 2, wherein the indicia is in the form of a projection of light.

4. The method of claim 2, wherein the indicia is a tangible surface.

5. A system for use with a data processing device, the system comprising:

indicia of a virtual keyboard having a plurality of keys, the virtual keyboard defining a working area;

a first light source and a second light source, the second light source is configured to provide a second fan shaped beam of light substantially parallel to and above the working area at a second elevation, the second elevation is greater than a first elevation, the first light source and the second light source to output pulses alternating in time between the first light source and the second light source;

an image sensing system, the image sensing system to capture images of the working area responsive to light scattered from either the first fan shaped beam of light or the second fan shaded beam of light;

a processor, the processor is configured to analyze the captured images for variations in light intensity within the working area from the second fan shaped beam of light, the processor is further configured to:

generate a first histogram by summing the light intensity in each of a first number of columns;

determine a second number of columns corresponding to a portion of the first histogram that is above a first threshold light intensity value;

generate a second histogram by summing the light intensity in each of a first number of rows in the second number of columns, determine a second number of rows corresponding to a portion of the second histogram that is above a second threshold light intensity value;

determine an identification of a key associated with finger presence based on the light intensity in the second number of rows and the second number of columns; and output the identification of the key to the data processing device.

6. The apparatus system of claim 5, wherein the indicia is a projection of light onto a surface.

7. The system of claim 5, wherein the indicia is a tangible surface.

8. The system of claim 5, further comprising:
a second processor communicatively coupled to receive a first signal corresponding to the identification; and
an association component, upon receipt of the first signal the second processor executes the association component to associate the first signal with a key location to form a finger presence association.

9. The system of claim 8, wherein the association component utilizes stored data pertaining to the virtual keyboard to perform the association.

10. The system of claim 9, wherein the stored data in a lookup table is used to establish a keyboard layout and the keyboard layout is selected from the group consisting of QWERTY, AZERTY, Dvorak, ABCDE, XPeRT, and user defined.

11. The system of claim 10, wherein the communication component provides information to a text-to-speech processor to provide an audible message related to the association.

12. The system of claim 9, further comprising:
a communication component, to communicate the association to a user.

13. The system of claim 12, wherein the communication component provides information to a data display to display the association in a region of the data display.

14. A method for use with a data processing device to detect finger presence above a key, the apparatus method comprising:

providing a second fan shaped beam of light substantially parallel to and above a working area at a second elevation, the second elevation is larger than a first elevation, the working area including indicia of a virtual keyboard having a plurality of keys, the second fan shaded beam of light is used to detect finger presence above a key, the first elevation and a first fan shaped beam of light can be used to detect a selection of the key;

capturing images of the working area with an image capture device positioned above the second fan shaded beam of light, the image capture device captures images of light from the second fan shaded beam of light;

detecting a presence of a user's finger above a key of the plurality of keys from light received during the capturing; and outputting an identification of the key obtained during the detecting to the data processing device.

15. The method of claim 14, further comprising:
communicating the identification of the key to a user, wherein the communicating provides information to a data display to display the key on a soft keyboard, the soft keyboard is displayed in a region of the data display.

16. A method for use with a host device to detect finger presence above a key, the method comprising:

providing a second fan shaded beam of light substantially parallel to and above a working area at a second elevation, the second elevation is larger than a first elevation, the working area including indicia of a virtual keyboard having a plurality of keys, the second fan shaded beam of light is used to detect finger presence above a key and a first fan shaped beam of light projected substantially parallel to the working area at the first elevation can be used to detect a potential selection of the key;

capturing images of the working area with an image capture device positioned above the second fan shaped beam of light;

detecting a presence of a user's finger above a key of the plurality of keys, the detecting further comprising:
analyzing each of the captured images for variations in light intensity, the analyzing further comprising:
generating a first histogram by summing the light intensity in each of a first number of columns;
determining a second number of columns corresponding to a portion of the first histogram that is above a first threshold light intensity value;
generating a second histogram by summing the light intensity in each of a first number of rows in the second number of columns,
determining a second number of rows corresponding to a portion of the second histogram that is above a second threshold light intensity value;
determining an identification of the key from the light intensity corresponding to the pixels in the second number of rows and the second number of columns; and outputting an identification of the key obtained during the detecting to a host device.

17. The method of claim 16, further comprising:
communicating the key to a user.

18. The method of claim 17, wherein the communicating to display the key on a data display.

19. The method of claim 16, wherein a keyboard icon is displayed in a region of the data display and the key is displayed on the keyboard icon.

20. The method of claim 17, wherein the communicating is done with an audible communication.

21. A system for use with a data processing device to detect finger presence above a key, the system comprising:
  indicia of a virtual keyboard having a plurality of keys, the virtual keyboard defining a working area;
  a first light source configured to provide a first fan shaped beam of light above the working are at a first elevation, the first fan shaped beam of light can be used to detect a selected key from the plurality;
  a second light source configured to provide a second fan shaped beam of light above the working area at a second elevation, the second elevation is greater than the first elevation, the first light source and the second light source to alternate in time a pulsed output, the second fan shaped beam of light is used to detect finger presence above a key;
  an optical sensing system, the optical sensing system to capture images of the working area responsive to light scattered from either the first fan shaped beam of light or the second fan shaped beam of light;
  a key selection module, the key selection module to analyze the captured images for variations in light intensity within the working area from the second fan shaped beam of light, the key selection module further configured to:
    generate a first histogram by summing the light intensity in each of a first number of columns;
    determine a second number of columns corresponding to a portion of the first histogram that is above a first threshold light intensity value;
    generate a second histogram by summing the light intensity in each of a first number of rows in the second number of columns,
    determine a second number of rows corresponding to a portion of the second histogram that is above a second threshold light intensity value;
    determine an identification of the key associated with finger presence based on the light intensity in the second number of rows and the second number of columns; and
  output the identification of the key as a finger presence signal to the data processing device.

22. The system of claim 21, further comprising:
  an interface for receiving a finger presence signal responsive to the identification; and
  an association component coupled to the interface, to receive the finger presence signal for associating a finger location with a key of the virtual keyboard to create a finger presence association; and
  a display engine to receive the finger presence association and to display a soft keyboard on a data display, the soft keyboard contains the finger presence association as a hot-key on the soft keyboard.

23. A computer readable storage medium storing program code for causing a data processing device to perform the steps comprising:
  generating a second fan shaped beam of light substantially parallel to and above a working area at a second elevation, the second elevation is larger than a first elevation, the working area including indicia of a virtual keyboard having a plurality of keys, the second fan shaped beam of light is used to detect finger presence above a key and a first fan shaped beam of light projected substantially parallel to the working area at the first elevation can be used to detect a potential selection of the key;
  capturing images of the working area with an image capture device positioned above the second fan shaped beam of light;
  detecting a presence of a user's finger above a key of the plurality of keys, the detecting further comprising:
    analyzing each of the captured images for variations in light intensity, the analyzing further comprising:
      generating a first histogram by summing the light intensity in each of a first number of columns;
      determining a second number of columns corresponding to a portion of the first histogram that is above a first threshold light intensity value;
      generating a second histogram by summing the light intensity in each of a first number of rows in the second number of columns,
      determining a second number of rows corresponding to a portion of the second histogram that is above a second threshold light intensity value;
    determining an identification of the key from the light intensity corresponding to the pixels in the second number of rows and the second number of columns; and
  outputting an identification of the key obtained during the detecting to the data processing device.

24. The computer readable storage medium of claim 23, further comprising:
  associating the finger presence signal with the key of the virtual keyboard to produce an association of the user's finger and the key; and
  displaying the association on a data display.

25. The computer readable storage medium of claim 24, wherein the association is displayed on a soft keyboard, the soft keyboard is displayed on the data display.

* * * * *